United States Patent [19]

Jolliff

[11] Patent Number: 5,971,881
[45] Date of Patent: *Oct. 26, 1999

[54] VARIABLE SPEED TRANSMISSION AND TRANSAXLE

[75] Inventor: Norman E. Jolliff, Salem, Ind.

[73] Assignee: Tecumseh Products Company, Tecumseh, Mich.

[ * ] Notice: This patent is subject to a terminal disclaimer.

[21] Appl. No.: 09/015,818

[22] Filed: Jan. 29, 1998

Related U.S. Application Data

[63] Continuation-in-part of application No. 08/738,842, Oct. 28, 1996, Pat. No. 5,860,884.

[51] Int. Cl.⁶ .................................................. F16H 47/04
[52] U.S. Cl. ................................ 475/89; 475/72; 475/78; 475/94; 180/378
[58] Field of Search ................................ 475/72, 73, 78, 475/80, 89, 93, 94; 180/76, 378

[56] References Cited

U.S. PATENT DOCUMENTS

| | | |
|---|---|---|
| 1,161,066 | 11/1915 | Minor . |
| 2,133,276 | 10/1938 | Ballantyne . |
| 2,212,046 | 8/1940 | Ross . |
| 2,488,408 | 11/1949 | Hollmann . |
| 2,490,720 | 12/1949 | Thurber . |
| 2,552,010 | 5/1951 | Marsell . |
| 2,851,908 | 9/1958 | Nakamura . |
| 2,921,483 | 1/1960 | Colmerauer . |
| 3,404,761 | 10/1968 | Jaeschke . |
| 3,749,217 | 7/1973 | Bush . |
| 3,924,490 | 12/1975 | Mills . |
| 4,012,968 | 3/1977 | Kelbel . |
| 4,181,042 | 1/1980 | Rau . |
| 4,270,415 | 6/1981 | Dickinson . |
| 4,334,843 | 6/1982 | Hansen . |
| 4,439,119 | 3/1984 | Petersen . |
| 4,468,981 | 9/1984 | Ries . |
| 4,489,626 | 12/1984 | Lemon . |
| 4,729,261 | 3/1988 | Tervola . |
| 4,932,209 | 6/1990 | Okada . |
| 4,979,583 | 12/1990 | Thoma . |
| 4,994,002 | 2/1991 | Valotto et al. ............................ 475/72 |
| 5,078,549 | 1/1992 | Von Kaler . |
| 5,078,659 | 1/1992 | Von Kaler et al. ........................ 475/78 |
| 5,203,747 | 4/1993 | Warren ...................................... 475/72 |
| 5,228,366 | 7/1993 | Thoma et al. ......................... 475/72 X |
| 5,310,388 | 5/1994 | Qkcuoglu . |
| 5,403,241 | 4/1995 | Jarchow et al. .......................... 475/72 |
| 5,409,425 | 4/1995 | Shibahata .............................. 475/72 X |
| 5,473,964 | 12/1995 | Okada . |
| 5,512,021 | 4/1996 | Shash . |
| 5,536,215 | 7/1996 | Shaffer . |
| 5,611,746 | 3/1997 | Shaffer .................................. 475/89 X |
| 5,785,622 | 7/1998 | Perry ..................................... 475/89 X |
| 5,785,623 | 7/1998 | Iino et al. ............................. 475/80 X |
| 5,803,856 | 9/1998 | Iino et al. ................................. 475/72 |
| 5,860,884 | 1/1999 | Joliff ....................................... 475/89 |

FOREIGN PATENT DOCUMENTS

| | | |
|---|---|---|
| 0 216 540 | 4/1987 | European Pat. Off. . |
| 853542 | 3/1940 | France . |
| 2 623 868 | 2/1989 | France . |
| 2 213 217 | 8/1989 | United Kingdom . |
| 2 259 338 | 3/1993 | United Kingdom . |
| WO 89/11405 | 11/1989 | WIPO . |

*Primary Examiner*—Dirk Wright
*Assistant Examiner*—Peter T. Kwon
*Attorney, Agent, or Firm*—Baker & Daniels

[57] ABSTRACT

A variable speed, reversible transmission that utilizes two gerotor pumps for variable controlling the speed of the output shaft or axle. A rotatable input member connectable to a drive source drives first and second epicyclic gear trains, which drive the two pumps. As the fluid flow through each pump is variably restricted, the epicyclic gears associated therewith revolve about the input member, causing a worm gear intermediate the input member and the output member to variably rotate in a forward or reverse direction. The worm gear transmits rotational power from the input member to the output member in response to the fluid flow restriction through each pump. The present invention also provides for the two pumps comprising a modular pump unit and a system of transmissions employing a common modular pump assembly. Further, the present invention provides engine/transaxle modules in which the engine is mounted on the transaxle housing, and a self-propelled lawn and garden implement having a drive source which includes a variable speed transmission or transaxle which utilizes a pump for variable controlling the speed of its output shaft or axle.

54 Claims, 18 Drawing Sheets

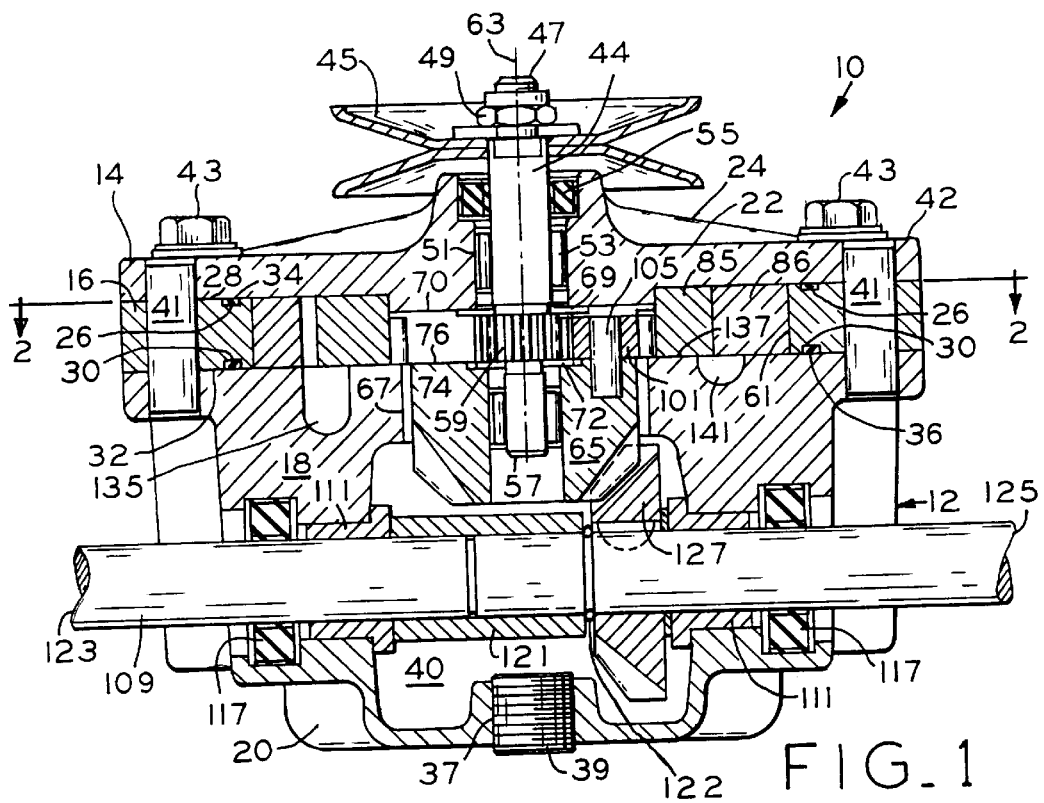
FIG_1
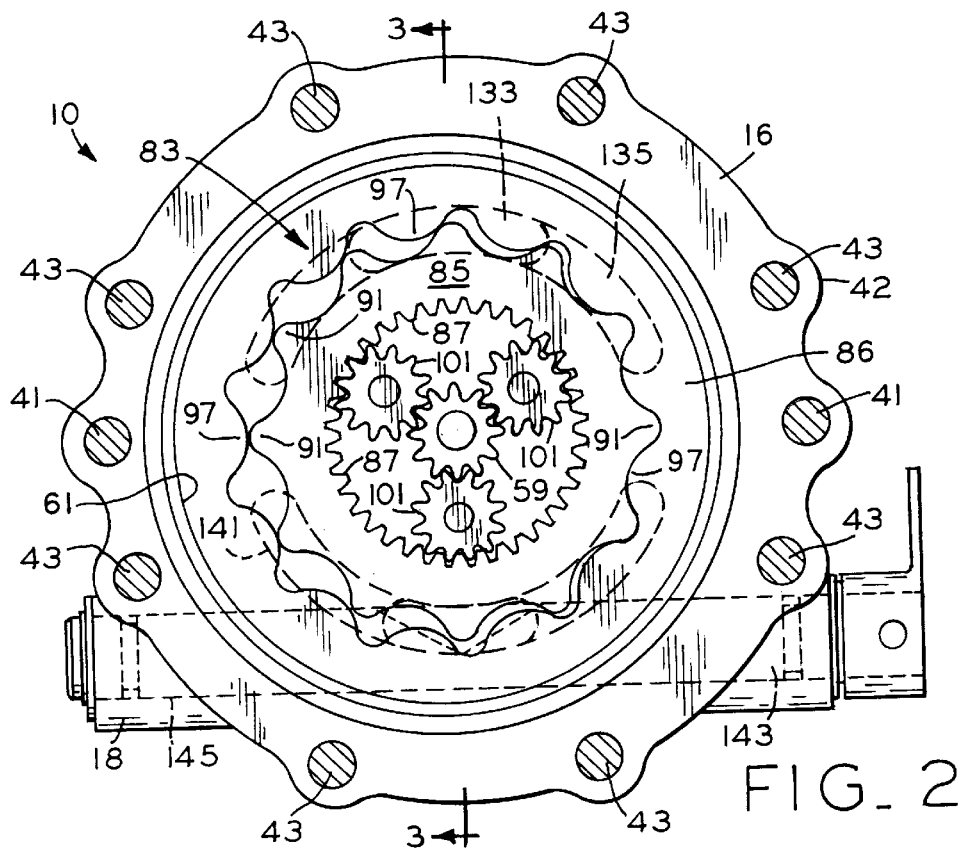
FIG_2

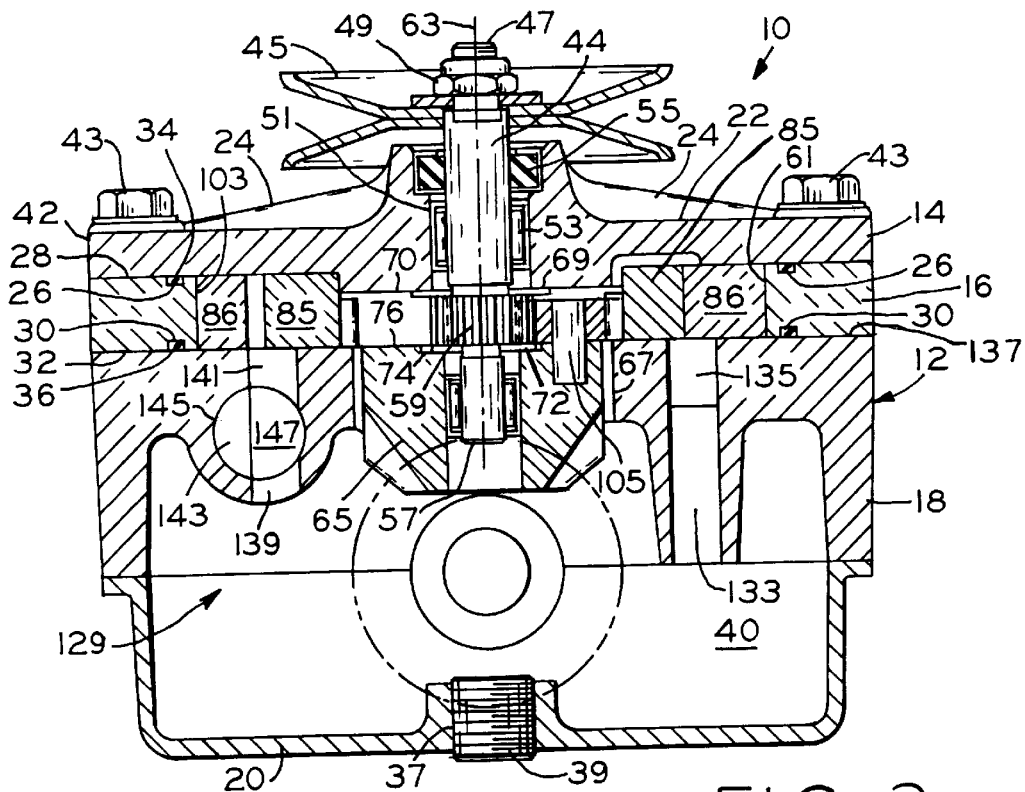
FIG_3
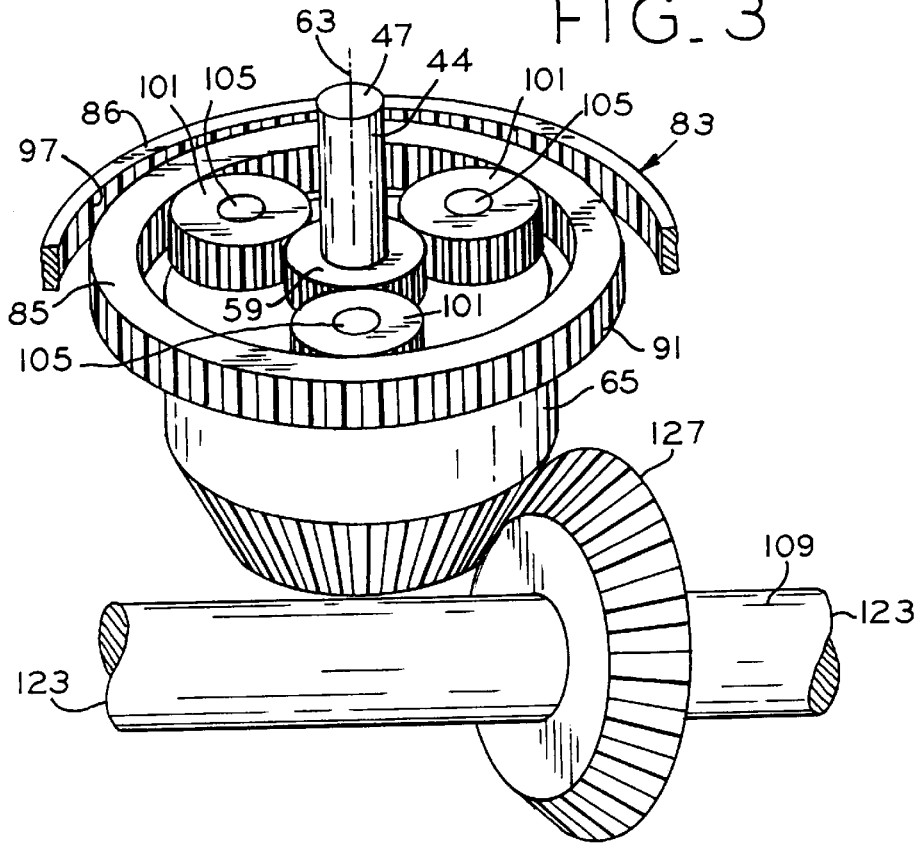
FIG_4

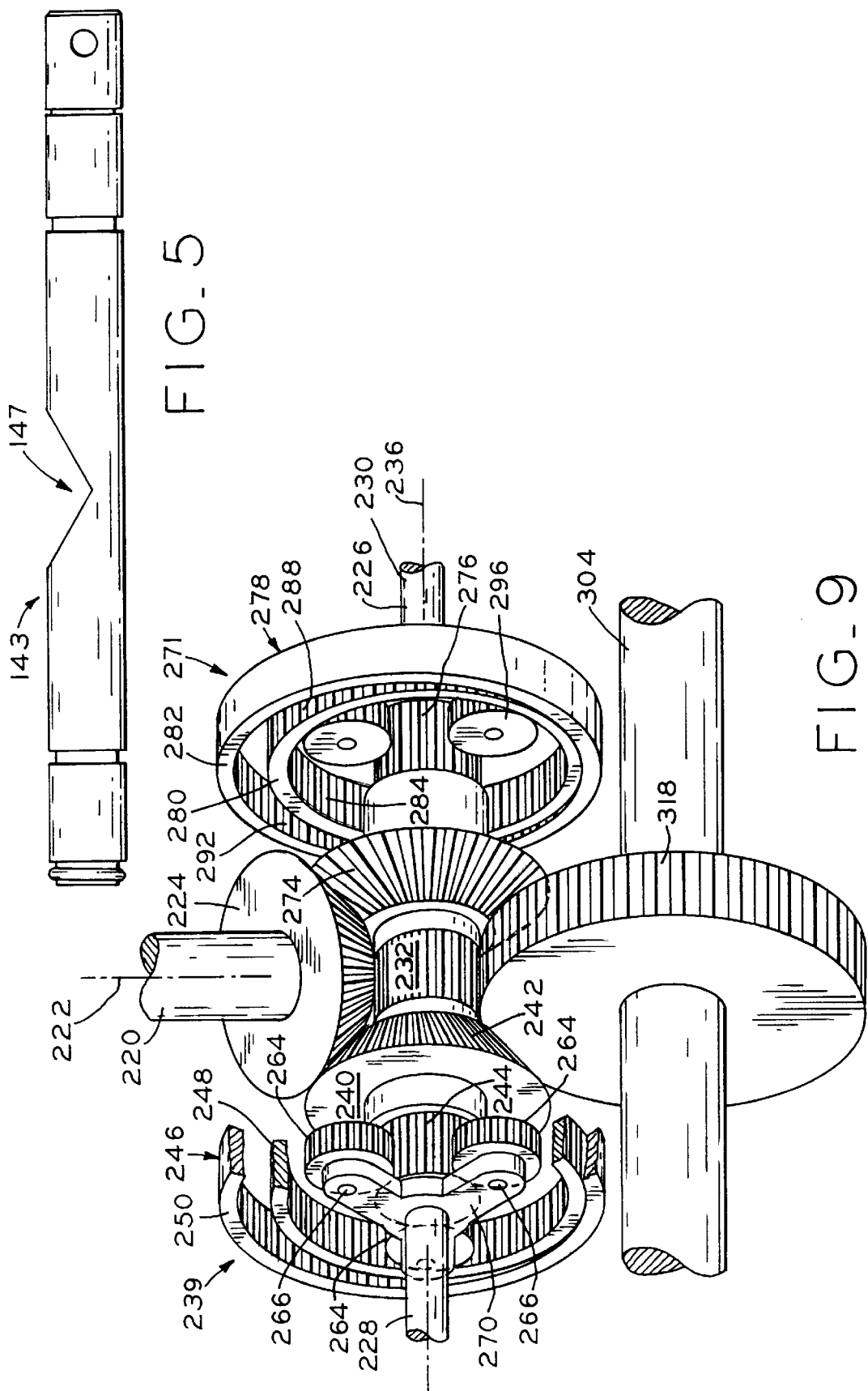

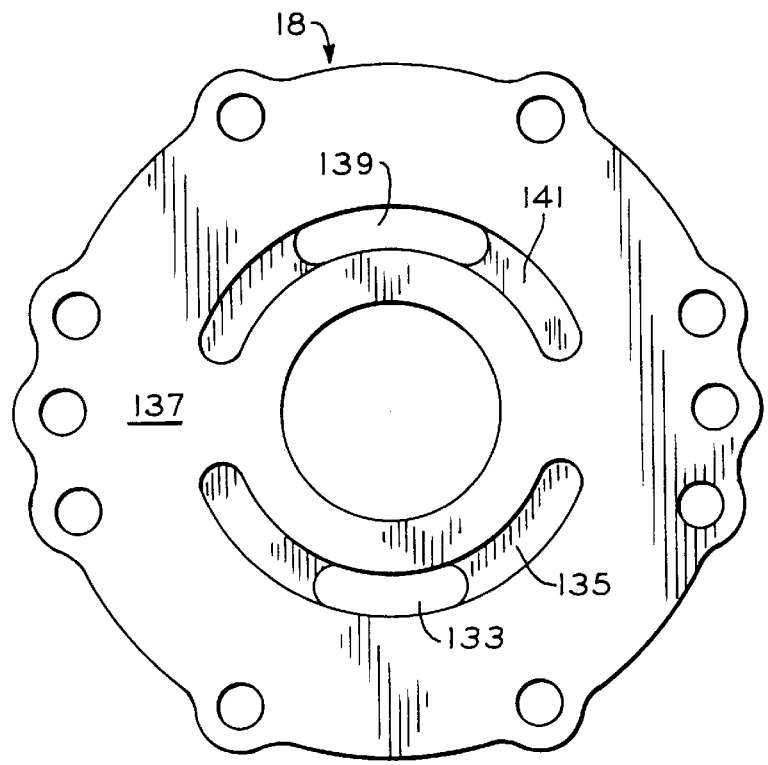
FIG_6
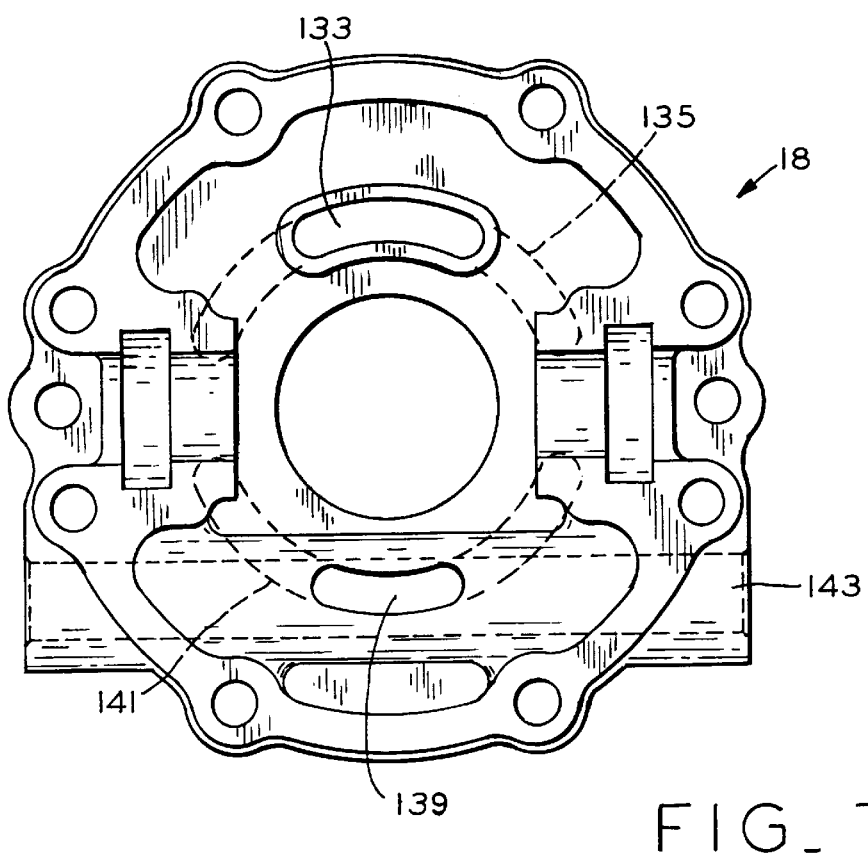
FIG_7

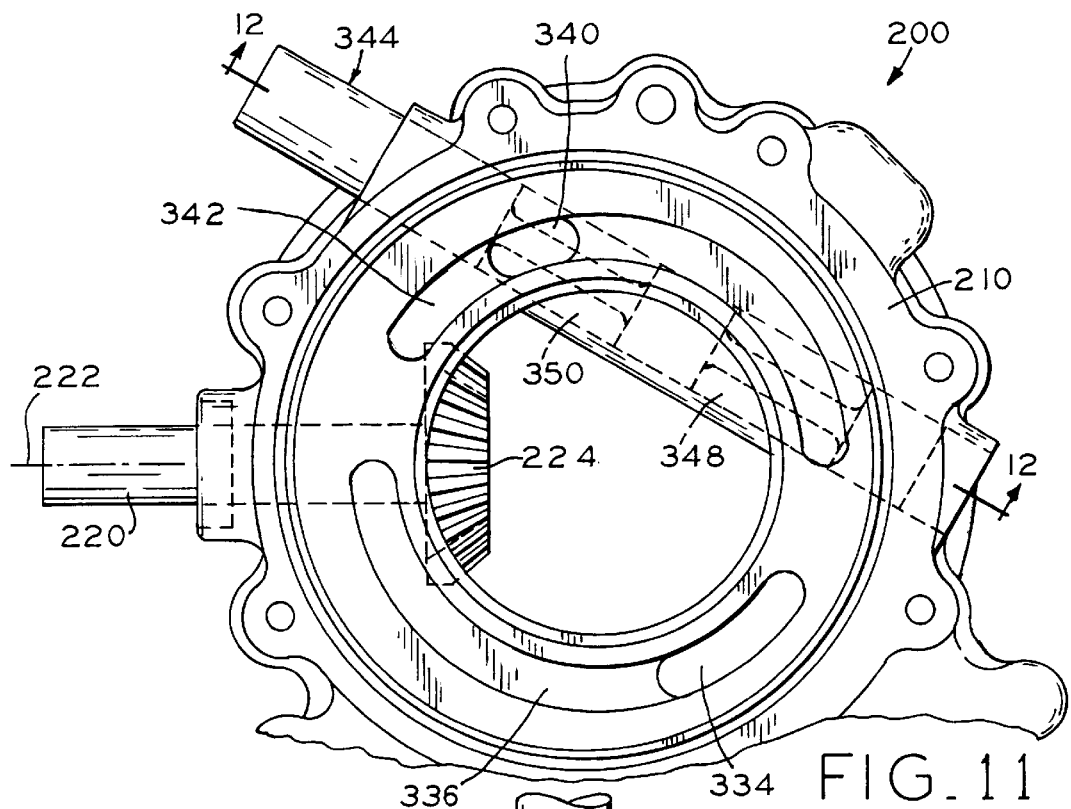
FIG._11
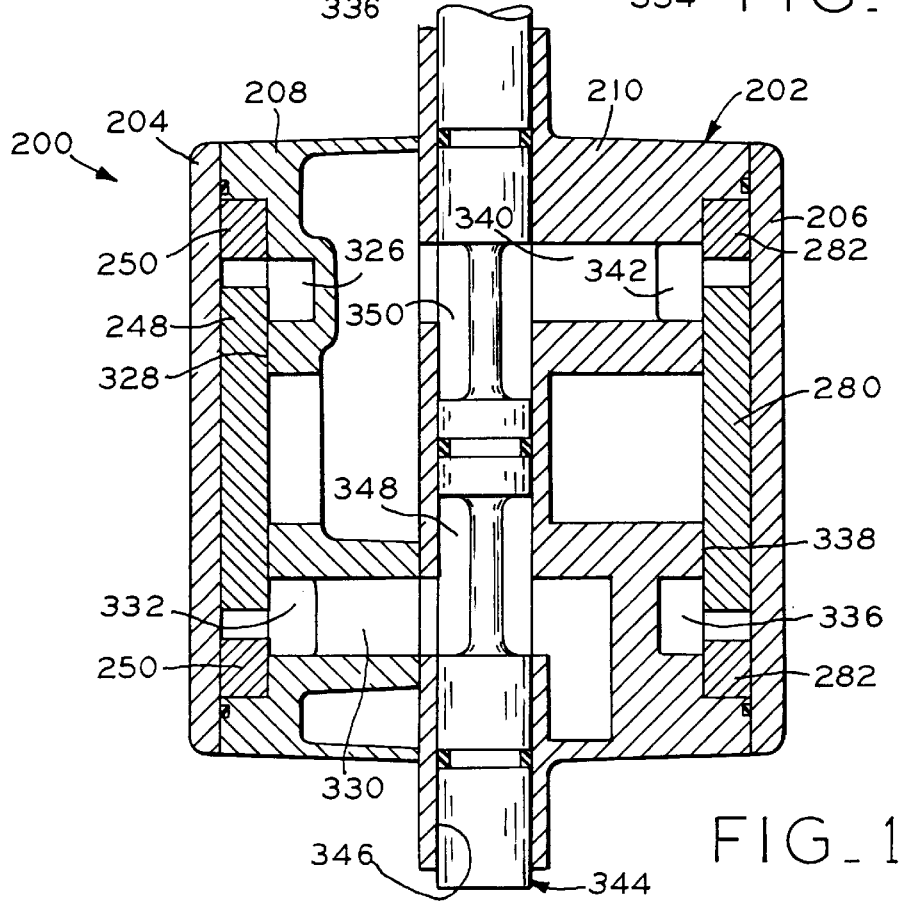
FIG._12

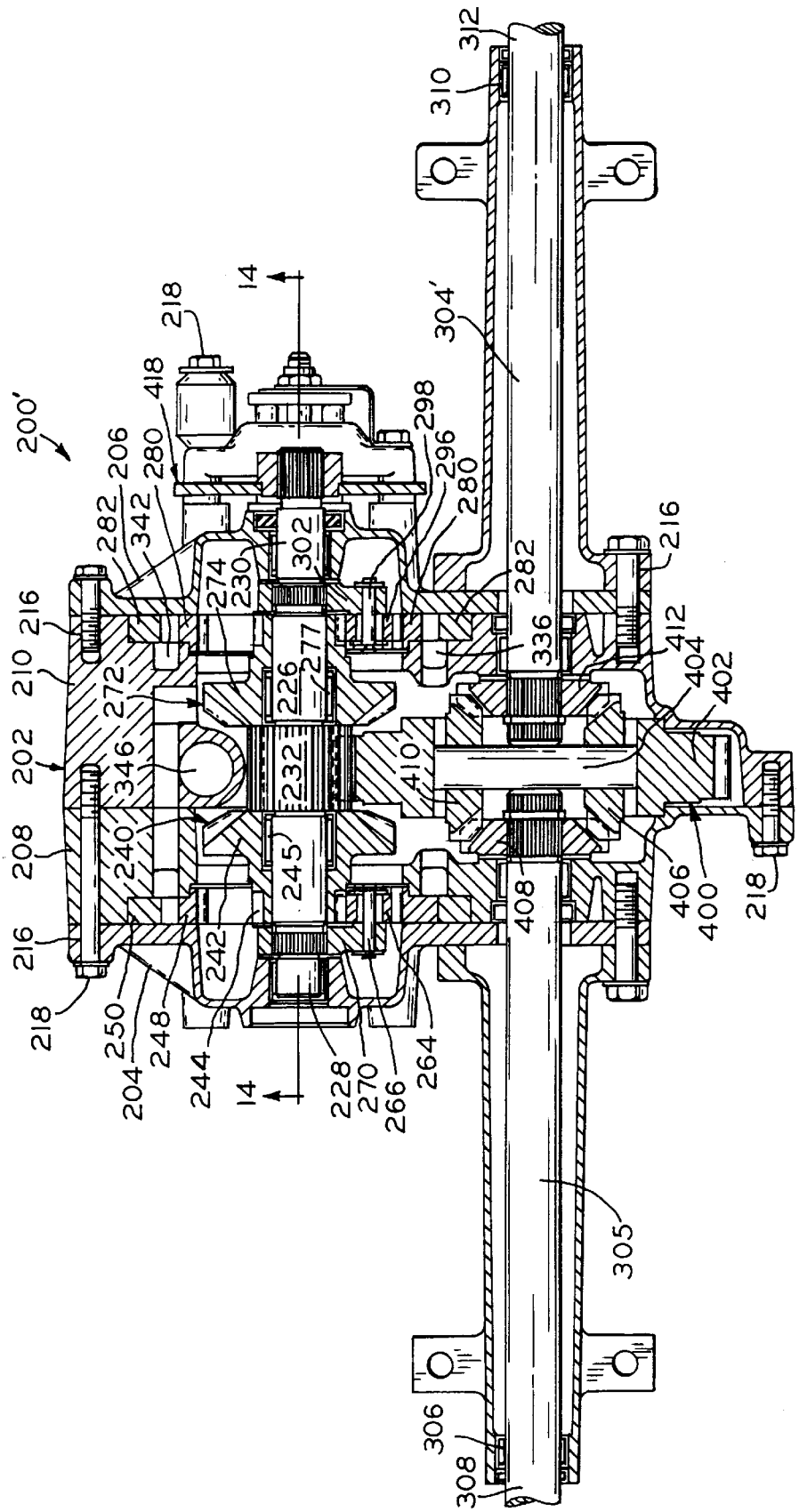
FIG_13

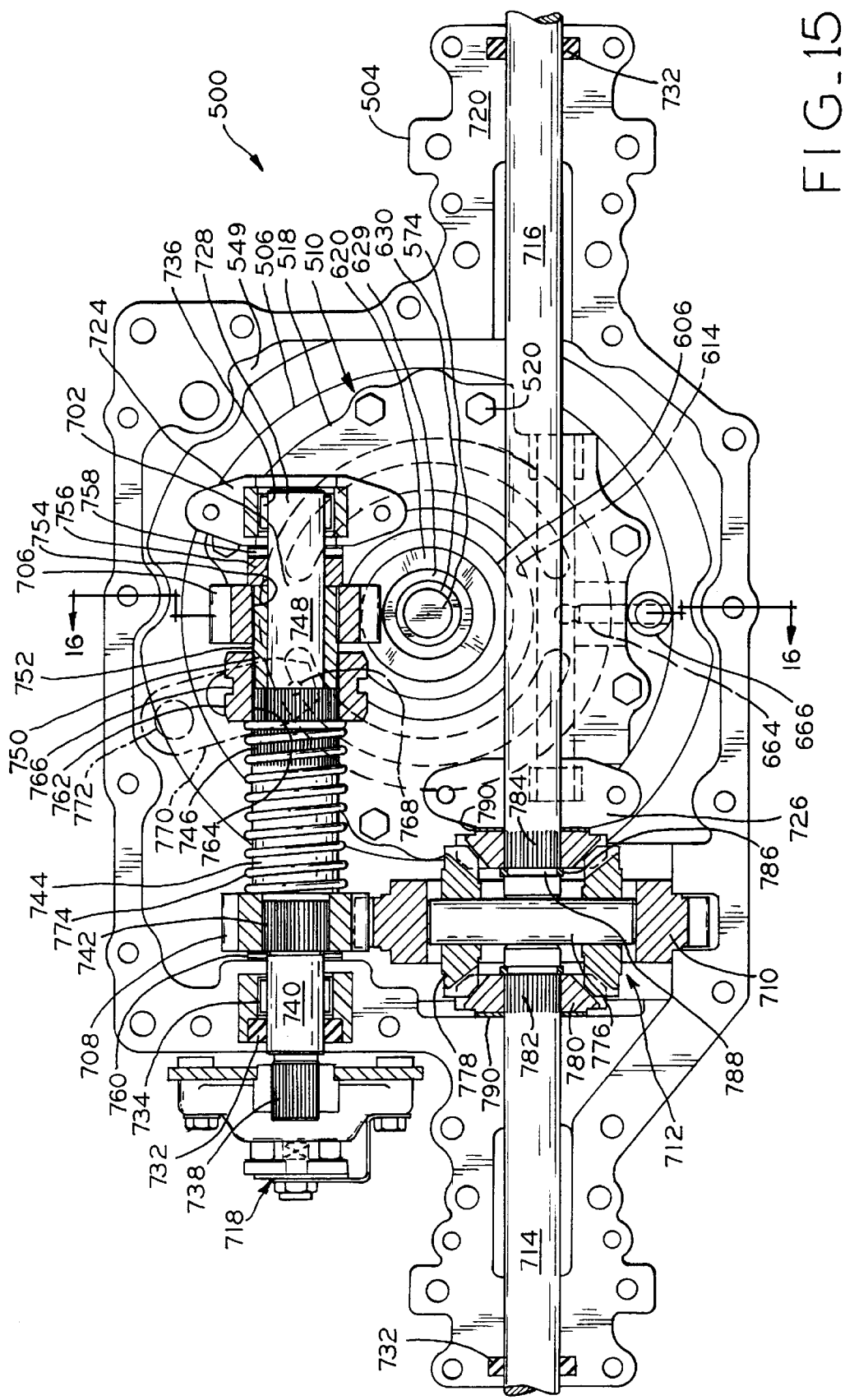
FIG._15

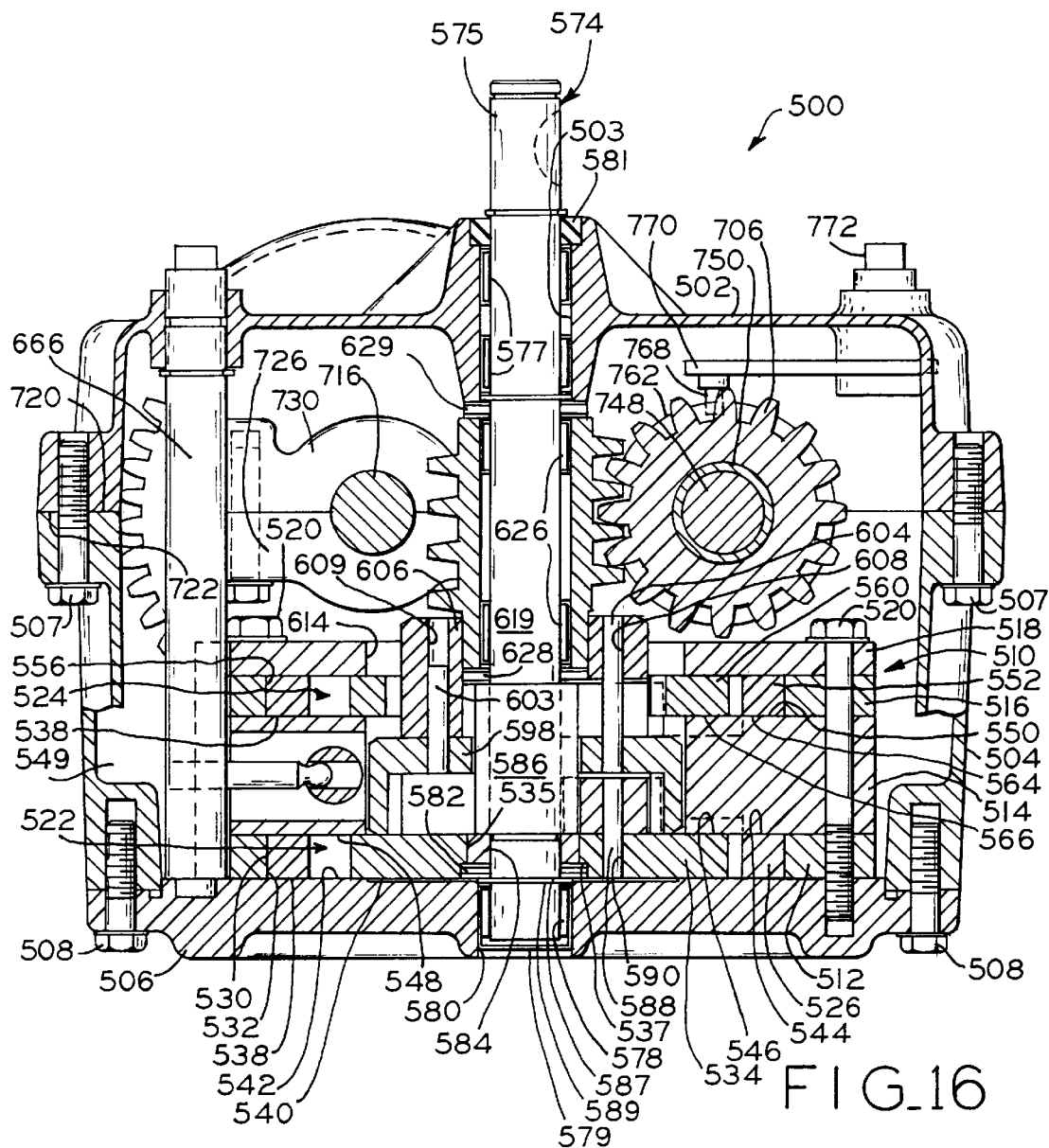
FIG_16

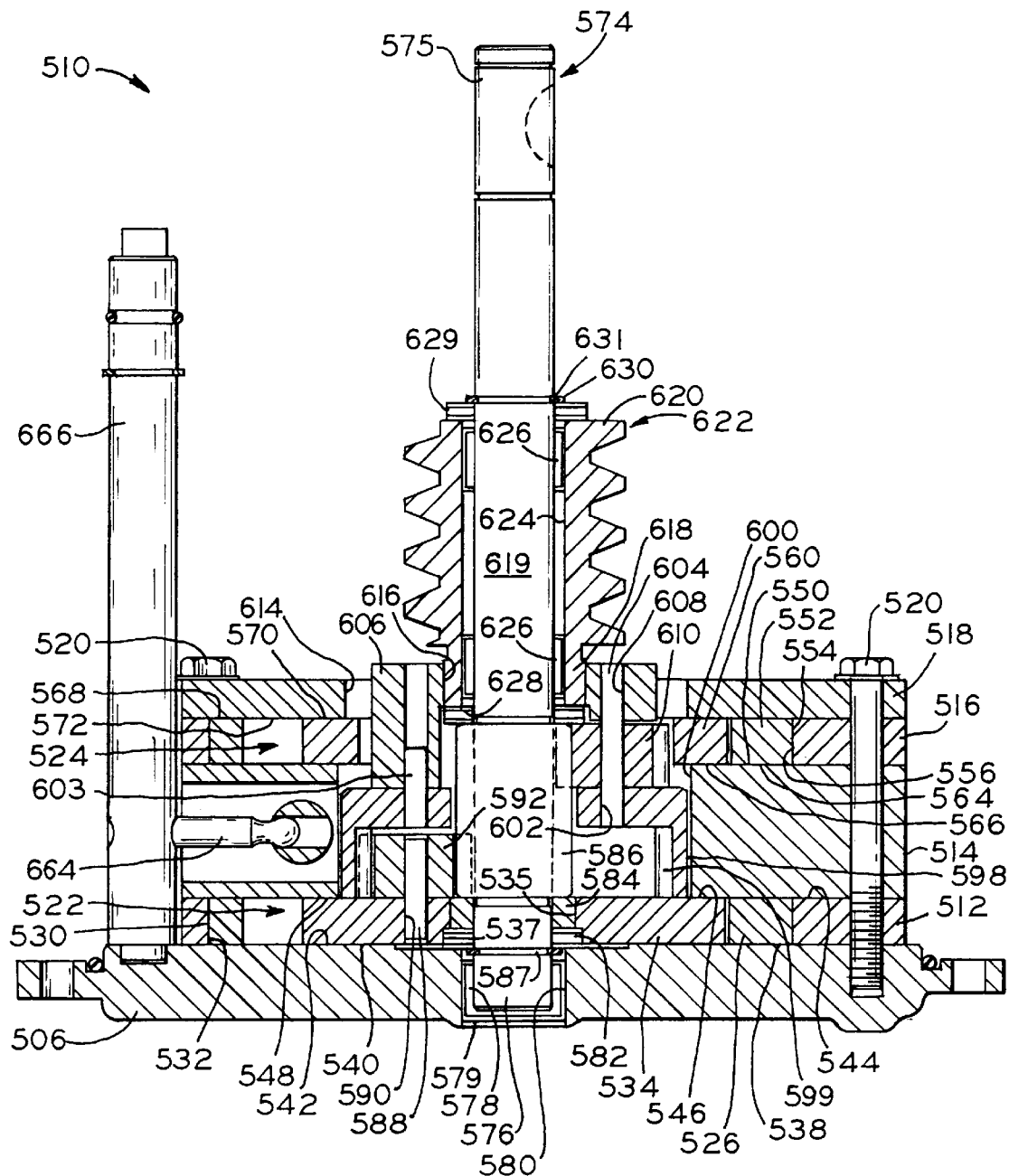
FIG_17

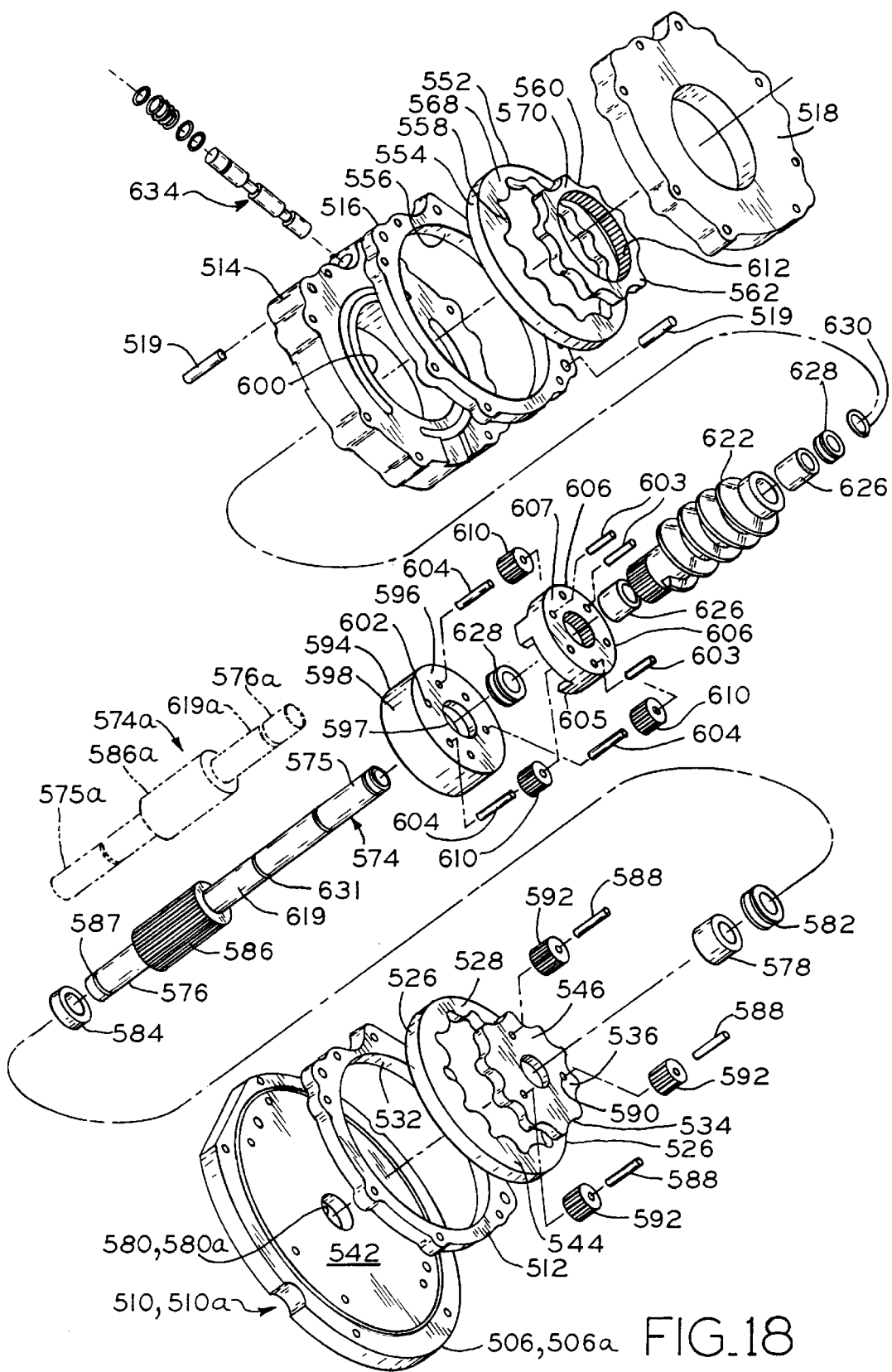
FIG_18

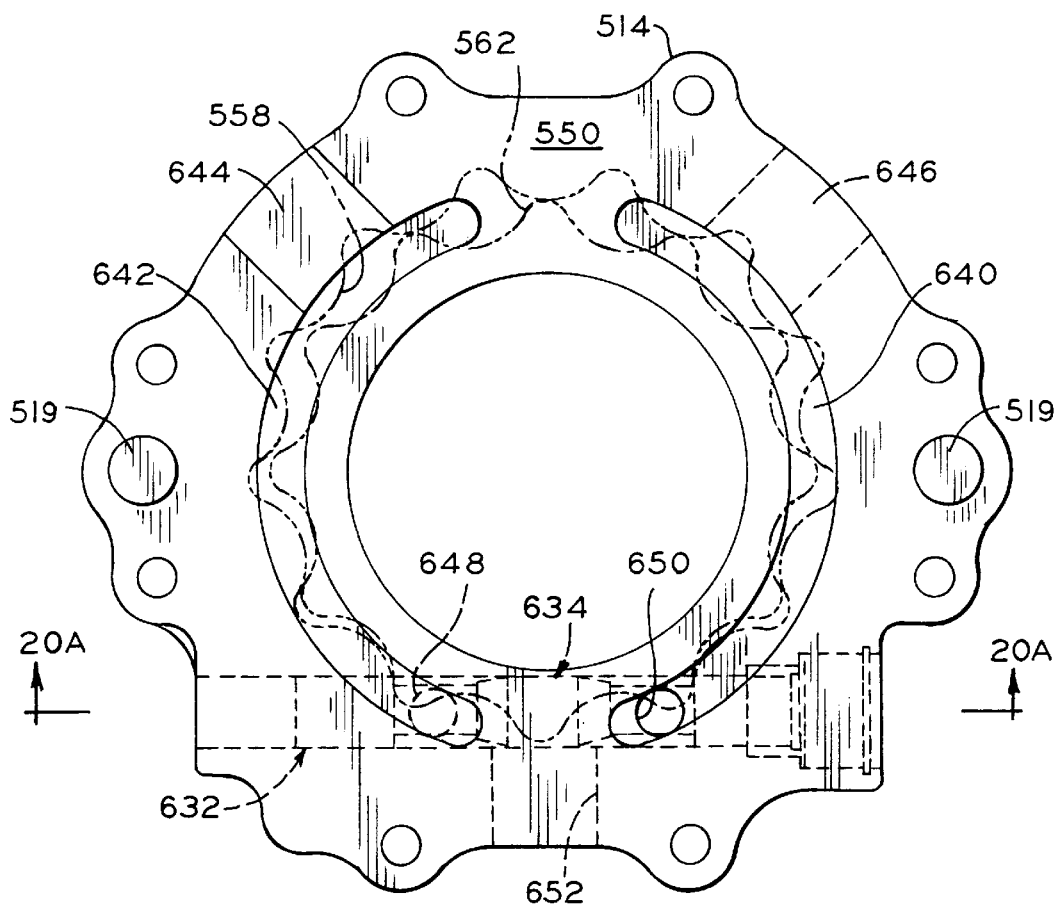
FIG_19
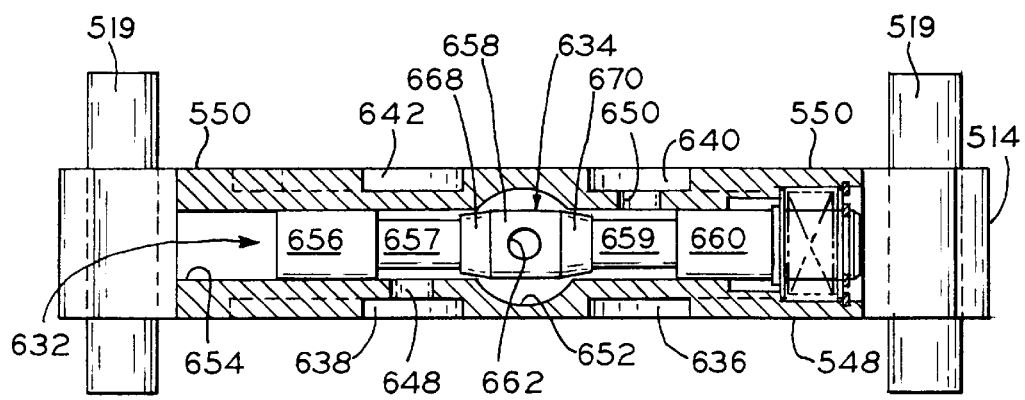
FIG_20A

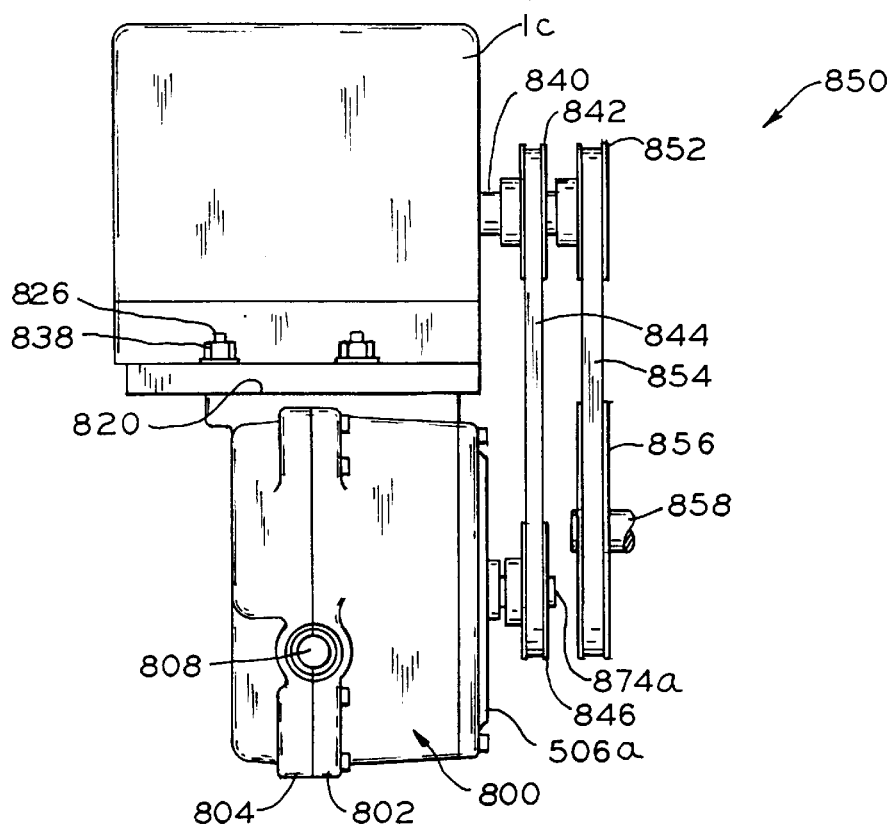
FIG_24
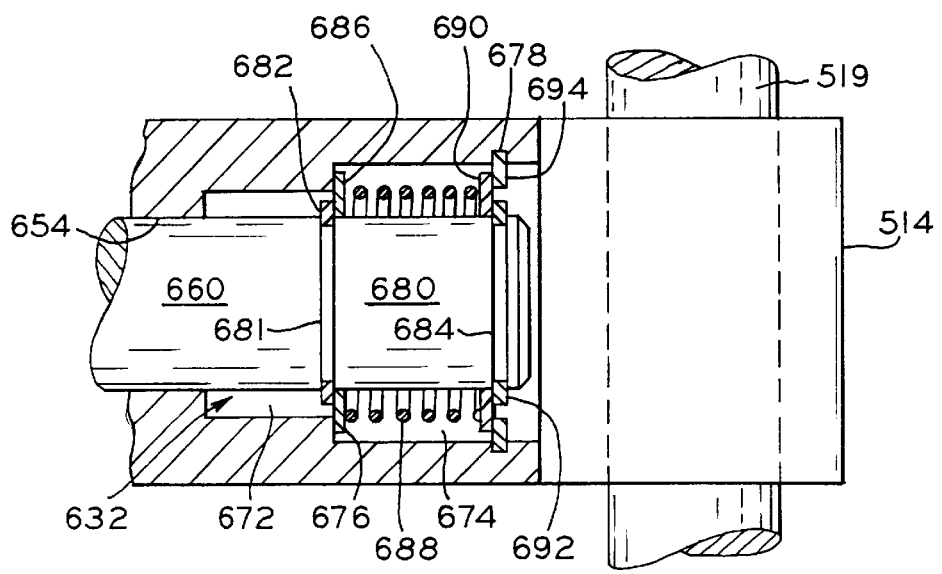
FIG_20B

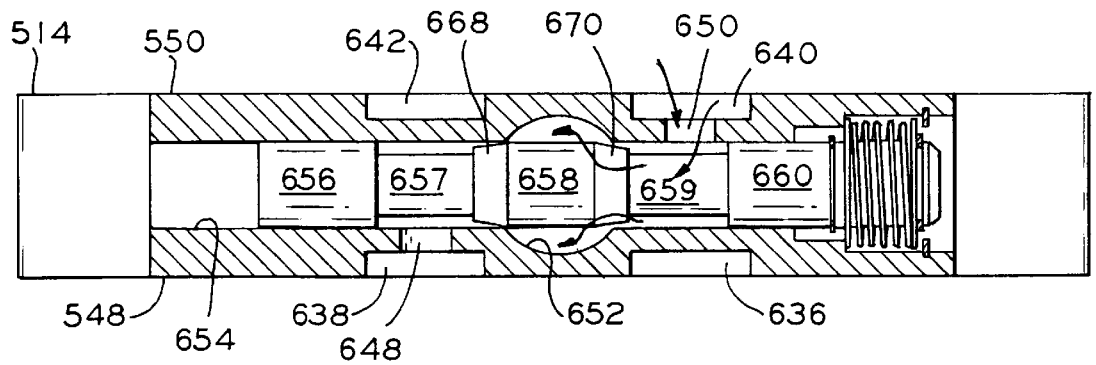
FIG_21A
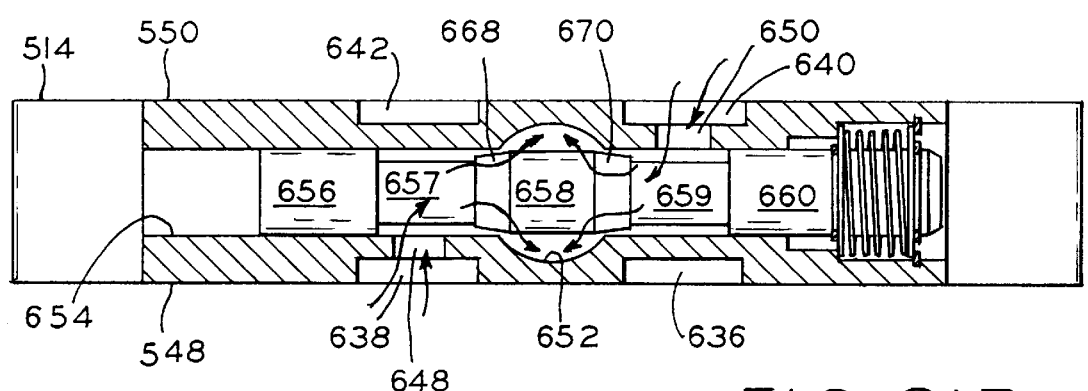
FIG_21B
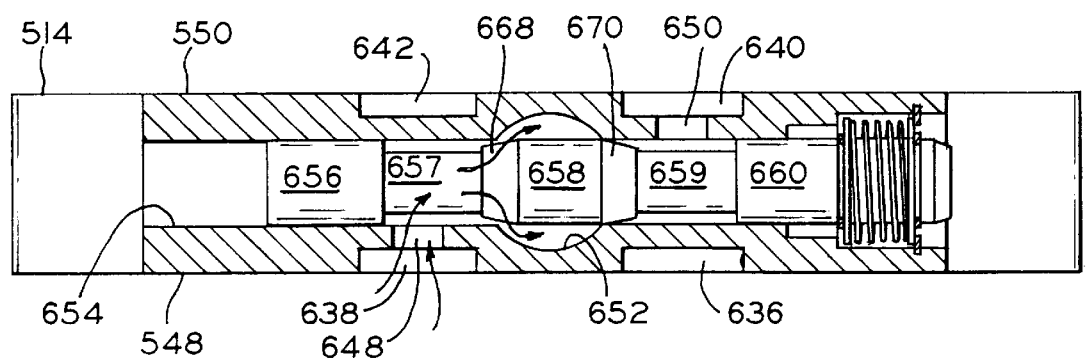
FIG_21C

VARIABLE SPEED TRANSMISSION AND TRANSAXLE

CROSS-REFERENCE TO RELATED APPLICATIONS

This is a continuation-in-part of previously application Ser. No. 08/738,842, filed Oct. 28, 1996, now U.S. Pat. No. 5,860,884, issued Jan. 19, 1999, entitled "VARIABLE SPEED TRANSMISSION AND TRANSAXLE" by the present inventor.

FIELD OF THE INVENTION

The present invention relates to variable speed transaxles and transmissions, and, in particular, to a hydromechanical transmission coupling the input shaft to the output shaft.

BACKGROUND OF THE INVENTION

Small variable speed machines, such as lawn mowers, lawn and garden tractors, snow throwers, tillers and the like, include a drive source, such as an internal combustion engine, which is used to provide power for rotatably driving an axle which is coupled to wheels which are to be rotatably driven. Most typically, the drive source operates at a single, rotary mechanical speed. Yet, for practical reasons, the axle needs to be able to be rotatably driven at a variety of forward, reverse, and/or neutral speeds. Accordingly, such vehicles may incorporate a transaxle which is used to convert the single speed, rotary mechanical motion of the energy source into a variety of output speeds.

Generally, a transaxle comprises a transaxle input shaft which is operationally coupled to the drive source, a transaxle output shaft, e.g., an axle, which is operationally coupled to the elements, e.g., wheels, which are to be rotatably driven, and transaxle componentry which operationally couples the transaxle input shaft to the transaxle output shaft. It is the transaxle componentry which converts the single speed, rotary mechanical motion received from the drive source into a variety of output speeds for rotatably driving the output shaft.

A variety of forms of transaxle componentry have been known in the art. For example, one embodiment of a transaxle which has been known in the art incorporates a clutch pedal and a gear shifting mechanism which are used to adjust the speed of the output shaft. Such transaxles require that the clutch be depressed in order to accomplish a change in direction and/or speed. In some instances, complete stopping may be required before a direction or speed change can be accomplished.

As an improvement to clutch controlled transaxles, various types of clutchless, variable speed transaxles have been developed which control output speed through a single lever. In a typical mode of operation, the lever is moved forward to move the vehicle in the forward direction or pulled backward to move the vehicle in the reverse direction. The farther forward or backward the lever is displaced, the faster the vehicle travels in the corresponding direction.

One form of variable speed transaxle now in use includes hydrostatic componentry in which a variable fluid drive transfers variable speed rotary motion to the output shaft through a mechanical gear train. Although reliable, such transmissions tend to be relatively heavy and large in size, require greater amounts of horsepower to operate which would otherwise be available for mower or other implement operation, and are relatively expensive to manufacture and install due to complex componentry.

Another form of transaxle includes friction drive componentry in which a traction wheel engages a drive disk. The traction wheel is moved radially across the center of rotation of the drive disk to vary output speed and/or direction. Such componentry, however, is unable to transfer large amounts of torque and therefore tends to slip within certain speed and/or load ranges. Moreover, such systems may require frequent servicing due to a lack of reliability.

Clutchless transaxles which control output speed entirely through mechanical means have also been proposed. A representative embodiment of this form of transaxle is described, for example, in U.S. Pat. No. 4,726,256 (Von Kaler). This transaxle uses dual drive power input shafts for connection to a drive power source. The dual input shafts are parallel, rotate in the same direction, and are coupled to a planetary gear system incorporating a sun gear, planet gears, and a ring gear. The relative rotational speeds between the two input shafts cause the planet gears to revolve clockwise, counterclockwise, or remain motionless relative to the axis of the sun gear. The speed of revolution of the planet gears is transferred to the output shaft through an output gear assembly to which the planet gears are coupled. Thus, varying the relative rotational speed of the two input shafts is used to control the revolution speed and direction of the planet gears, and hence the rotational speed and direction of the output shaft.

The transaxle of U.S. Pat. No. 4,726,256 thus provides a variable speed transaxle in which dual transaxle input shafts are coupled to the transaxle output shaft by a mechanical drive train incorporating a planetary gear system. Such a transaxle offers the potential for highly efficient power transfer from the input shafts to the output shaft. Nonetheless, the need to always drive two different input shafts may adversely affect the maximum efficiency which could be achieved by the transaxle. Further, the transaxle uses mechanical means to provide a braking action for controlling engine speed, which increases the weight and mechanical complexity of the transaxle.

Different types of pumps may be incorporated into vehicle drive systems. One known type of pump includes an externally toothed pinion gear connected to its input shaft, and the pinion gear meshes with an epicyclic gear mechanism. As the fluid path through the pump changes, the rotation speed of the pinion gear and epicyclic gear mechanism changes. However, incorporation of this separate pump into a transaxle may increase the complexity and manufacturing costs of such a transaxle, and further may frustrate attempts to provide a sufficiently compact and conveniently sized transaxle for certain applications.

Accordingly, there remains a need in the art for a reliable, simple, economic, relatively compact, clutchless, rugged, durable, variable speed transaxle which provides forward/neutral operation or forward/neutral/reverse operation.

SUMMARY OF THE INVENTION

The present invention provides a variable speed transaxle in which the transaxle input shaft is coupled to the transaxle output shaft by a hydromechanical drive train incorporating an epicyclic gear system, yet the transaxle uses hydrostatic componentry as a braking mechanism to control output speed. As a result, the present invention provides an improved, epicyclic gear-based transaxle which is simple, efficient, reliable, easy to manufacture, compact, rugged, durable, clutchless, and capable of providing variable forward/neutral operation or forward/neutral/reverse operation.

The present invention provides a variable speed transmission assembly including a rotatable input member connectable to a drive source, a rotatable output member, a gear train, a pump, and an adjustable valve. The gear train is operatively connected to the input member and the output member for transmitting rotational power of the input member to the output member, and the gear train includes an epicyclic gear. The pump pumps a fluid through a fluid conduit and uses a gear member of the epicyclic gear as a pump element that is disposed in a fluid engaging position within the fluid conduit. The adjustable valve provides for varying resistance to movement of fluid within the fluid conduit between first and second resistance levels. The epicyclic gear member revolves at a first speed to cause rotation of the output member at a first rate when the resistance to fluid movement within the fluid conduit is at the first resistance level and the input member rotates at a drive speed, and the epicyclic gear member revolves at a second speed to cause rotation of the output member at a second rate when the resistance to fluid movement within the fluid conduit is at the second resistance level and the input member rotates at the drive speed.

The present invention also provides a variable speed transaxle including a housing for an internally disposed gear train and an internally disposed pump for pumping fluid along a fluid conduit, at least one axle shaft rotatably supported in the housing, and an input shaft extending into the housing. The gear train includes an epicyclic gear and is drivingly connected between the input shaft and at least one axle shaft. The pump is connected to the gear train and operable to allow variable speed rotation of at least one axle shaft.

The present invention further provides a reversible transmission including a rotatable input member connectable to a drive source, an output member rotatable in forward and reverse directions, a housing, a first pump within the housing for pumping a fluid through a first fluid conduit, a second pump within the housing for pumping a fluid through a second fluid conduit, and first and second gear trains. The first gear train is operatively connected to the input member and the output member for transmitting rotational power of the input member to the output member to rotate the output member in the forward direction. The first gear train includes an epicyclic gear coupled with the first pump and structured and arranged such that operation of the first pump controls a transmittal of rotational power to the output member through the first gear train, whereby a rotation of the output member in the forward direction is controllable. The second gear train is operatively connected to the input member and the output member for transmitting rotational power of the input member to the output member to rotate the output member in the reverse direction. The second gear train includes an epicyclic gear coupled with the second pump and structured and arranged such that operation of the second pump controls a transmittal of rotational power to the output member through the second gear train, whereby a rotation of the output member in the reverse direction is controllable.

The present invention also provides a self-propelled lawn and garden implement having at least two ground-engaging wheels, a rotating blade, an engine and a variable speed transmission comprising a rotatable input member connectable to the engine. A rotatable output member is connectable to at least one wheel, and a gear train is operatively connected to the input member and the output member for transmitting rotational power of the input member to the output member, the gear train comprising an epicyclic gear including a first gear member. The transmission further comprises a pump for pumping a fluid through a fluid conduit, the pump including a first element disposed in a fluid engaging position within the fluid conduit and comprising the first gear member. An adjustable valve is provided for varying a resistance to movement of fluid within the fluid conduit between a first resistance level and a second resistance level. The first gear member revolves at a first speed to cause rotation of the output member at a first rate when the resistance to fluid movement within the fluid conduit is at the first resistance level and the input member rotates at a drive speed. The first gear member revolves at a second speed to cause rotation of the output member at a second rate when the resistance to fluid movement within the fluid conduit is at the second resistance level and the input member rotates at the same drive speed.

The present invention also provides a self-propelled lawn and garden implement having at least two ground-engaging wheels, a rotating blade, an engine and a variable speed transaxle comprising a housing for an internally disposed gear train and an internally disposed pump for pumping fluid along a fluid conduit, at least one axle shaft rotatably supported in the housing, and an input shaft extending into the housing. The gear train includes an epicyclic gear and is drivingly connected between the input shaft and at least one axle shaft. The pump is connected to the gear train and is operable to vary the speed of rotation of at least one axle shaft.

The present invention further provides a variable speed, reversible transmission comprising a rotatable input member connectable to a drive source, a output member rotatable in forward and reverse directions, a housing, a first pump for pumping fluid through a first conduit, a second pump for pumping fluid through a second conduit, and a gear train comprising a first epicyclic gear train operably connecting the input member and the first pump, a second epicyclic gear train operably connecting the input member and the second pump, and a worm gear intermediate the input and output members and rotatable in a forward or a reverse direction in driven response to the first or second epicyclic gear trains.

The present invention also provides a variable speed, reversible transmission comprising a rotatable input member connectable to a drive source such as an engine, an output member rotatable in forward and reverse directions, a housing, a first pump for pumping fluid through a first conduit, a second pump for pumping fluid through a second conduit, a gear train comprising a first epicyclic gear train operably connecting the input member and the first pump, and a second epicyclic gear train operably connecting the input member and the second pump, the drive source mounted on the housing.

The present invention also provides a variable speed, reversible transmission comprising an output member rotatable in forward and reverse directions, a housing, and a pump assembly module. The pump assembly module comprises a rotatable input member connectable to a drive source, a first pump for pumping fluid through a first conduit, a second pump for pumping fluid through a second conduit, a first epicyclic gear train operably connecting the input member and the first pump, a second epicyclic gear train operably connecting the input member and the second pump, and a worm gear disposed about the input member. The transmission further comprises a countershaft assembly having first and second gears, the first gear intermeshed with the worm gear and the second gear connected with the output member. The pump assembly module may be assembled as a unit prior to its assembly to the housing.

The present invention also provides a system of variable speed, reversible transmissions comprising a rotatable input member connectable to a drive source, an output member rotatable in forward and reverse directions, a housing, a first pump for pumping fluid through a first conduit, and a second pump for pumping fluid through a second conduit. The system of transmissions further comprises a gear train comprising a first epicyclic gear train operably connecting the input member and the first pump, a second epicyclic gear train operably connecting the input member and the second pump, the first and second epicyclic gear trains interconnected through a carrier, a worm gear interconnected with the carrier, and a countershaft assembly having first and second gears, the first gear intermeshed with the worm gear, the second gear connected to the output member. Valve means disposed between the first and second pumps restricts flow through the first or second conduits.

Further, the present invention provides a self-propelled lawn and garden implement having at least two ground-engaging wheels, a rotatable blade, an engine and a variable speed, reversible transmission. The transmission comprises a rotatable input member connectable to the engine, an output member rotatable in forward and reverse directions, a housing, a first pump within the housing for pumping a fluid through a first fluid conduit, and a second pump within said housing for pumping a fluid through a second fluid conduit. The transmission further comprises a first gear train operatively connected to the input member and the output member for transmitting rotational power of the input member to the output member to rotate the output member in the forward direction, the first gear train comprising an epicyclic gear coupled with the first pump and structured and arranged such that operation of the first pump controls a transmittal of rotational power to the output member through the first gear train, whereby a rotation of the output member in the forward direction is controllable. The transmission further comprises a second gear train operatively connected to the input member and the output member for transmitting rotational power of the input member to the output member to rotate the output member in the reverse direction, the second gear train comprising an epicyclic gear coupled with the second pump and structured and arranged such that operation of the second pump controls a transmittal of rotational power to the output member through the second gear train, whereby a rotation of the output member in the reverse direction is controllable.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a sectional view of a variable speed transaxle according to a first embodiment of the present invention;

FIG. 2 is a plan sectional view taken along line 2—2 of FIG. 1 in the direction of the arrows;

FIG. 3 is a side sectional view taken along line 3—3 of FIG. 2 in the direction of the arrows;

FIG. 4 is a schematic, perspective view showing the functional componentry of the embodiment of FIG. 1 which is used to couple the input shaft to the output shaft;

FIG. 5 is a side view of a control rod used in the embodiment of FIG. 1;

FIG. 6 is a top view of the housing case used in the embodiment of FIG. 1;

FIG. 7 is a bottom view of the housing case of FIG. 6;

FIG. 9 is a schematic, perspective view showing the functional componentry of the transaxle of FIG. 8 which is used to couple the input shaft to the output shaft;

FIG. 11 is a side sectional view of the embodiment of FIG. 8 showing the position of the control rod relative to the discharge passage included in the right case member;

FIG. 12 is a sectional view taken along line 12—12 of FIG. 11 in the direction of the arrows, showing the orientation of the control rod in the transaxle housing;

FIG. 13 is a plan sectional view of a third embodiment of a transaxle according to the present invention;

FIG. 15 is a plan sectional view of a variable speed transaxle according to a fourth embodiment of the present invention, also showing the shift collar engaging fork;

FIG. 16 is a side sectional view of the embodiment of FIG. 15 taken along line 16—16 in the direction of the arrows;

FIG. 17 is an enlarged side sectional view of the pump assembly used in the embodiment of FIG. 15;

FIG. 18 is an exploded view of the pump assembly of FIG. 17;

FIG. 19 is a plan view of the control plate of the embodiment of FIG. 15;

FIG. 20A is a sectional rear view of the control plate of FIG. 19 taken along line 20—20 in the direction of the arrows, also showing the control valve;

FIG. 20B is an enlarged fragmentary view of a portion of FIG. 20A, showing the control valve spring arrangement;

FIG. 21A is an enlarged view of FIG. 20A, showing the control valve in full forward speed position;

FIG. 21B is an enlarged view of FIG. 20A, showing the control valve in neutral position;

FIG. 21C is an enlarged view of FIG. 20A, showing the control valve in full reverse speed position;

FIG. 24 is a side view of an engine and transaxle module according to a sixth embodiment of the present invention;

Figure 8:
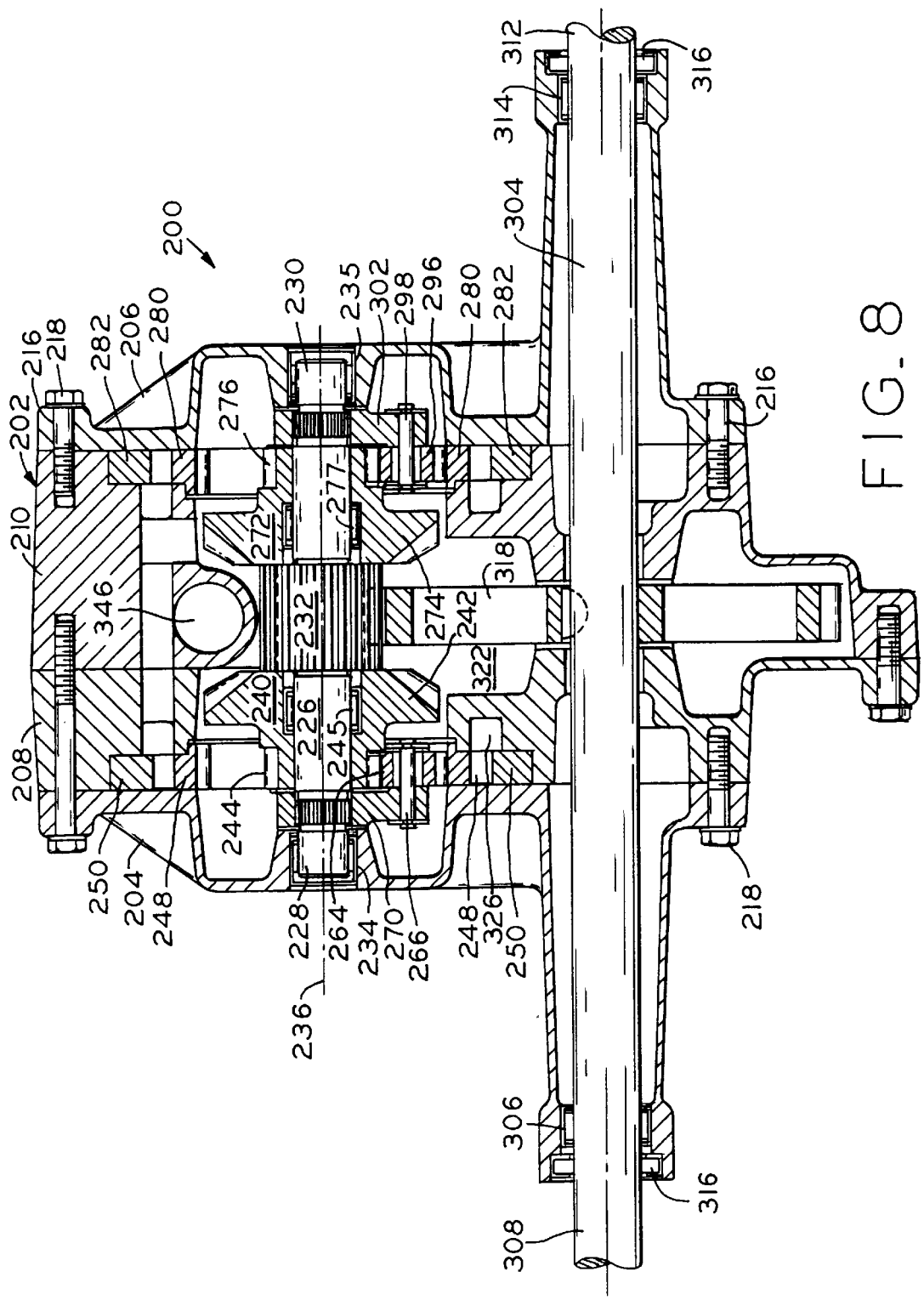
FIG. 8 is a sectional view of a variable speed transaxle according to a second embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in alternative forms, and such exemplifications are not to be construed as limiting the scope of the invention in any manner.

DETAILED DESCRIPTION OF THE INVENTION

The various aspects of the present invention will now be described with reference to the particular variable speed transaxle embodiments shown in FIGS. 1–23, the particular engine and transaxle module embodiment shown in FIG. 24, and the particular implements shown in FIGS. 25–27. However, the embodiments disclosed below are not intended to be exhaustive or to limit the invention to the precise forms disclosed in the following detailed description. For example, certain embodiments of the invention find beneficial application as a transmission wherein output shafts may be substituted for the axles shown and described herein.

Figure 25:
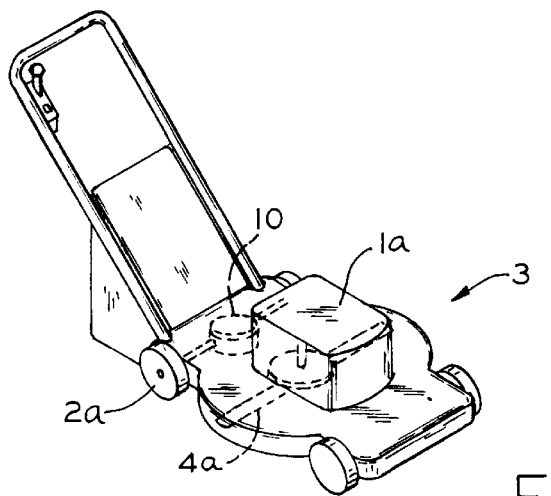
FIG. 25 is a perspective view of an implement according to a seventh embodiment of the present invention.
Figure 26:
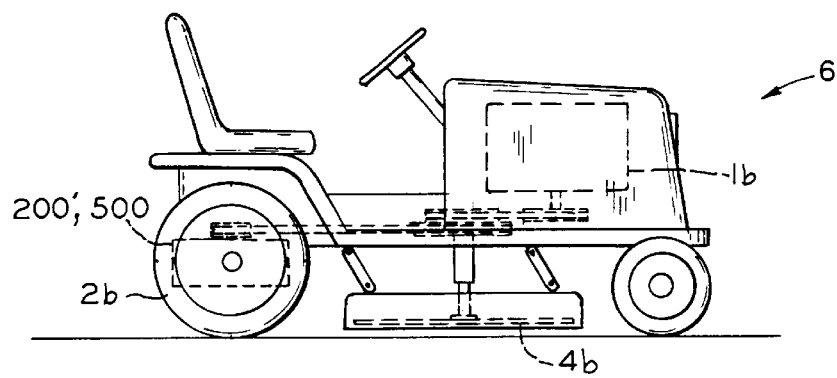
FIG. 26 is a perspective view of an implement according to an eighth embodiment of the present invention.

Referring first to FIGS. 1–7 and 25, there is shown one embodiment of a variable speed transaxle, generally designated 10, configured in accordance with the principles of the present invention. Transaxle 10 is particularly well suited for transferring rotary motion from an energy source such as internal combustion engine 1a to drive wheels 2a of walk-behind mower 3, for example, in which transaxle 10 is installed, mower 3a having at least one rotatable blade 4a (FIG. 25).

Transaxle 10 includes housing 12 comprising top cap 14, center plate 16, case 18 and bottom cap 20. Exterior face 22 of top cap 14 includes radially disposed ribs 24. Ribs 24 help strengthen top cap 14 and also provide an enlarged surface area for heat radiation in order to help cool housing 12 during transaxle operation. Center plate 16 includes annular recess 26 provided on top surface 28 proximal to the outer periphery of top surface 28. A similar annular recess 30 is provided on bottom surface 32 of center plate 16. O-rings 34 and 36 are disposed in recesses 26 and 30, respectively, in order to provide a fluid tight seal between center plate 16 and each of top cap 14 and case 18. Bottom cap 20 is provided with a threaded aperture 37 for receiving threaded plug 39. Threaded plug 39 can be easily removed and replaced when it is desired to change hydraulic fluid, e.g., oil, contained in integrally formed interior fluid cavity 40 of housing 12. A pair of dowel pins 41 used to align the transaxle componentry during assembly friction fit within bores provided within top cap 14, center plate 16 and case 18. A plurality of self-tapping fastening bolts 43 disposed around the outer periphery of housing 12 extend through top cap 14, center plate 16, case 18, and into bottom cap 20 to fasten together the transaxle housing.

Rotation input member 44 is in the form of an input shaft and is provided for receiving rotational power from the energy source of an internal combustion engine such as engine 1a of FIG. 25. In the embodiment shown in FIGS. 1–7, rotational power from the energy source is transmitted to shaft 44 using a drive belt (not shown) connected to pulley 45 which is secured to the top end 47 of shaft 44. Top end 47 of shaft 44 is threaded to receive threaded fasteners, generally designated as 49, for holding pulley 45 on shaft 44. A more preferred but not shown method of retaining a pulley on shaft 44 employs retaining rings above and below the pulley hub and a woodruff key keying the shaft and the pulley hub. Shaft 44 is rotationally supported in housing 12 through an aperture 51 provided in top cap 14. The interface between shaft 44 and top cap 14 includes needle bearings 53 and oil seal 55.

Intermediate bottom end 57 and top end 47 of shaft 44, shaft 44 is provided with pinion gear 59. As shown, pinion gear 59 is integrally formed with shaft 44, but could be formed as a separate component which is fixedly mounted to shaft 44 by a key, splines, or the like, if desired. Pinion gear 59 is provided between bottom end 57 and top end 47 in a manner such that pinion gear 59 is disposed in a through aperture 61 provided in center plate 16. When rotatably driven by the drive source, shaft 44 and pinion gear 59 rotate about axis of rotation 63.

First power transmitting bevel gear 65 is rotatably mounted to bottom end 57 of shaft 44. First power transmitting bevel gear 65 is freely rotatable about shaft 44 in a manner such that rotation of shaft 44 does not directly cause rotation of bevel gear 65 and vice versa. As seen best in FIGS. 1 and 3, bevel gear 65 is mounted to the bottom end 57 of shaft 44 in a manner such that bevel gear 65 is disposed in through aperture 67 of case 18. Washer 69 is disposed on shaft 44 above pinion gear 59 and is braced against the bottom surface 70 of top cap 14. Additionally, washer 72 is disposed on shaft 44 below pinion gear 59 and is braced against recess 74 provided in the top face 76 of bevel gear 65.

With particular reference to FIG. 2, gerotor pump mechanism 83 generally comprises inner gerotor gear 85 and outer gerotor gear 86. Gerotor gears 85 and 86 are disposed in through aperture 61 of center plate 16 in a manner such that the inner gerotor gear 85 is disposed circumferentially around pinion gear 59 and the outer gerotor gear is disposed radially outward from inner gerotor gear 85. Inner gerotor gear 85 and pinion gear 59 are spaced apart radially such that the two gears are not in direct contact at any point around their respective circumferences. Inner gerotor gear 85 includes gear teeth or lobes 87 disposed on the inner periphery of gerotor gear 85 as well as gear teeth or lobes 91 disposed on the outer periphery. Outer gerotor gear 86 includes lobe-shaped gear teeth 97 disposed on the inner periphery of gerotor gear 86. Gear teeth 91 and 97 of inner gerotor gear 85 and outer gerotor gear 86 are adapted for intermeshing pumping engagement such that rotation of inner gerotor gear 85 and outer gerotor gear 86 provide a pumping action capable of pumping a flow of fluid along a fluid pathway extending to and from a fluid supply as will be described in more detail below.

In the practice of the present invention, inner gerotor gear 85 and outer gerotor gear 86 have a resistance to rotation which can be variably controlled in a continuous range extending from a first condition in which inner gerotor gear 85 and outer gerotor gear 86 are freely rotatable to a second condition in which gerotor gears 85 and 86 are locked up and unable to rotate. The resistance to rotation of inner gerotor gear 85 and outer gerotor gear 86 can be easily controlled and set to any desired value within such continuous range merely by adjusting the flow of fluid being pumped by gerotor gears 85 and 86. As will be described below with respect to a mode of operation of transaxle 10, the present invention uses the resistance to rotation of inner gerotor 85 and outer gerotor gear 86 to control the rotational speed at which transaxle 10 drives wheels drivingly coupled to transaxle 10.

Planet gears 101 of An epicyclic gear train are disposed in meshing engagement with pinion gear 59 and inner gerotor gear 85. Thus, planet gears 101 drivingly couple inner gerotor gear 85 to sun or pinion gear 59. In the embodiment shown in FIGS. 1–7, transaxle 10 includes three planet gears 101, although a greater or lesser number of such gears could still be used within the scope of the present invention. Each planet gear 101 is also rotatably mounted on a pin 105 which, in turn, is mounted in the top face of first power transmitting bevel gear 65.

Planet gears 101 are rotatably driven by pinion gear 59 according to three desirable modes of operation. In a first mode of operation, when the resistance to rotation of gerotor gears 85 and 86 is at a minimum, gerotor gears 85 and 86 can be rotatably driven by planet gears 101 at a speed corresponding to the rotational speed of pinion gear 59. In this mode of operation, planet gears 101 are essentially functioning as idler gears, transferring rotational motion from pinion gear 59 to inner gerotor gear 85. In this mode, gerotor gears 85 and 86 are driven at maximum pumping speed. Further, each planet gear 101 freely rotates about its corresponding pin 105, but none of planet gears 101 revolve around the axis of rotation 63 of shaft 44. In this mode of operation, transaxle 10 is effectively in neutral inasmuch as the rotational power of shaft 44 is not being transferred to axle 109.

In a second mode of operation, when the resistance to rotation of gerotor gears 85 and 86 is increased, planet gears 101 are only capable of rotatably driving gerotor gears 85 and 86 at a lesser rotational speed than that corresponding to the rotational speed of pinion gear 59. In this mode of operation, planet gears 101 will not only rotatably drive inner gerotor gear 85 at such lesser speed, but will also "walk" inside inner gerotor gear 85, i.e., revolve about axis of rotation 63. Because each of planet gears 101 is coupled to first power transmitting bevel gear 65 by a pin 105, the revolution of planet gears 101 about the axis of rotation 63 of shaft 44 rotatably drives the bevel gear 65 about axis of rotation 63 at a rotational speed corresponding to the revolution speed of planet gears 101. Inasmuch as bevel gear 65 is operatively coupled to the axle 109, the rotational power from shaft 44 is thereby transferred to axle 109. As the resistance to rotation of gerotor gears 85 and 86 is increased, the revolution speed of planet gears 101 about axis of rotation 63, and hence the rotational speed of axle 109, is increased. Thus, the rotational speed of axle 109 can be controlled easily by adjusting the resistance to rotation of the inner gerotor gear 85 and outer gerotor gear 86. As will be described in more detail below, such resistance to rotation is easily controlled merely by adjusting the flow of fluid being pumped by inner gerotor gear 85 and outer gerotor gear 86.

In a third mode of operation, when the resistance to rotation of gerotor gears 85 and 86 is adjusted to a sufficiently high level, planet gears 101 are unable to rotatably drive gerotor gears 85 and 86. In such a mode, planet gears 101 revolve about axis of rotation 63 at maximum speed, thus driving axle 109 at maximum speed as well.

Axle 109 is rotatably journalled within housing 12 in cylindrical sleeves 111 supported in case 18 and bottom cap 20. Oil seals 117 provide a fluid tight seal between axle 109 and the corresponding engaging portion of housing 12 at which axle 109 extends from housing 12 in order to prevent hydraulic fluid from escaping from housing 12. Spacer tube or sleeve 121 is freely mounted on axle 109 and traps retainer ring 122 that prevents side to side movement of axle 109. First end 123 and second end 125 of axle 109 extend outward from housing 12 in mutually opposite directions. One or both ends 123 and 125 of axle 109 may be coupled to an element which is to be rotatably driven. For example, in applications in which transaxle 10 is to be used in equipment such as lawn mower 3 shown in FIG. 25, first end 123 and second end 125 of axle 109 may be operatively coupled to drive wheels 2*a* of the lawn mower.

Second power transmitting gear 127 is in the form of a bevel gear keyed to axle 109 and operationally couples axle 109 to first power transmitting bevel gear 65. Thus, when bevel gear 65 is rotatably driven by the revolution of planet gears 101 about axis 63, rotational power of first power transmitting bevel gear 65 is transferred to axle 109 via second power transmitting gear 127. This causes axle 109 to rotate at a speed corresponding to the revolution speed of planet gears 101.

With particular reference to FIGS. 3, 6 and 7, transaxle 10 further includes a fluid pathway system along which a hydraulic fluid, such as oil, is pumped by the pumping action provided by inner gerotor gear 85 and outer gerotor gear 86. The fluid pathway system includes integral interior cavity 40 which serves as an oil sump and which is in fluid communication with fluid intake passage 133 provided in case 18. Fluid intake passage 133, in turn, is in fluid communication with arcuate recess 135 provided in the top surface 137 of case 18. Arcuate recess 135, in turn, is in fluid communication with gerotor pump 83 such that the pumping action of gerotor gears 85 and 86 draws fluid into gerotor pump 83 through fluid intake passage 133 and arcuate recess 135. Similarly, interior cavity 40 is in fluid communication with fluid discharge passage 139 also provided in case 18, and fluid discharge passage 139 is in fluid communication with arcuate recess 141 provided in top surface 137 of case 18. Arcuate recess 141, in turn, is in fluid communication with gerotor pump 83 such that the pumping action of gerotor gears 85 and 86 discharges fluid from gerotor pump 83 through arcuate recess 141 and fluid discharge passage 139.

In order to provide a valve mechanism for controlling the flow of fluid being pumped along the fluid pathway system, cylindrical control rod 143 is provided in a control rod aperture 145 (FIG. 3) extending through case 18. As seen best in FIG. 5, control rod 143 is configured with v-shaped notch 147, and the orientation of v-shaped notch 147 in control rod aperture 145 is used to control fluid flow through the pump, which in turn controls the output speed at which axle 109 is rotatably driven. For example, at one setting as is depicted in the Figures and seen best in FIGS. 2 and 3, control rod 143 may be rotated to a position such that v-shaped notch 147 is substantially aligned with fluid discharge passage 139 in a manner such that maximum fluid flow through fluid discharge passage 139 can occur. At this setting, the resistance to rotation of inner gerotor gear 85 and outer gerotor gear 86 is at a minimum because inner gerotor gear 85 and outer gerotor gear 86 have maximum freedom to pump fluid as gerotor gears 85 and 86 are caused to rotate. Under such conditions, planet gears 101 are capable of rotatably driving gerotor gears 85 and 86 at a rotational speed corresponding to the rotational speed of pinion gear 59. Thus, planet gears 101 rotatably drive gerotor gears 85 and 86 at this setting, but do not "walk" around axis of rotation 63. Thus, when control rod 143 is set so that fluid discharge passageway 139 is fully open, transaxle 10 is in a neutral mode of operation.

As control rod 143 is adjusted so that less fluid flow is allowed through fluid discharge passage 139, the resistance of inner gerotor gear 85 and outer gerotor gear 86 against rotation increases correspondingly. Now, when planet gears 101 are caused to rotate by the rotation of pinion gear 59, planet gears 101 are only capable of rotatably driving gerotor gears 85 and 86 at a lesser speed than that corresponding to the rotational speed of pinion gear 59. As a result, planet gears 101 not only cause gerotor gears 85 and 86 to rotate at such lesser speed, but planet gears 101 also will revolve around the axis of rotation 63, thus causing power transmitting bevel gear 65 to rotate about axis of rotation 63. This, in turn, causes axle 109, which is operationally coupled to power transmitting bevel gear 65 via gear 127, to rotate as well. As control rod 143 is adjusted to allow less and less fluid flow through fluid discharge passage 139, planet gears 101 revolve faster and faster about axis of rotation 63. Hence, axle 109 is driven correspondingly faster.

When control rod 143 is set such that fluid discharge passage 139 is fully closed, inner gerotor gear 85 and outer gerotor gear 86 are substantially immobilized and unable to rotate. All of the available rotational power from pinion gear 59 is now directed to causing planet gears 101 to revolve around axis of rotation 63 at a maximum revolution speed. Hence, axle 109 also rotates at its maximum speed at this setting.

Thus, by adjusting the rotational position of control rod 143 in control rod aperture 145, any desired amount of fluid flow through gerotor pump 83 can be achieved in a range from a no flow condition at which no fluid flow occurs to a maximum flow condition. Advantageously, gerotor pump 83 thereby serves as a variable brake that allows the rotational speed of axle 109 to be easily controlled and set to any desired rotational speed in a range from zero speed, i.e., neutral, to maximum speed.

It will be recognized that when intended for use as a transmission, the shown coupling of bevel gear 65 with axle 109 may be replaced with, for example, a coupling of bevel gear 65 to an output shaft. Furthermore, by connecting that output shaft to an axle through reversible gearing, forward and rearward propulsion of a vehicle in which such a transmission is installed may be achieved which would be of beneficial application in, for example, low cost self-propelled snow throwers.

Referring now to FIGS. 8–12, there is shown a second embodiment of a reversible, variable speed transaxle, generally designated 200, configured in accordance with the principles of the present invention. This embodiment is particularly useful for equipment such as snow throwers or wide-area walk-behind lawn mowers for which the transaxle needs to be reversible. FIG. 27 shows one embodiment of snow thrower 5 into which transaxle 200 may be incorporated. Snow thrower 5 further comprises internal combustion engine 1c, drive wheels 2c and at least one rotatable blade 4c.

Transaxle 200 includes a housing 202 comprising left exterior cap 204, right exterior cap 206, left case member 208, and right case member 210. The exterior face of right exterior cap 206 desirably includes a plurality of radially disposed ribs to help strengthen right exterior cap 206 and also to provide a larger surface area for heat radiation in order to help cool housing 202 during transaxle operation. The exterior face of left exterior cap 204 would include similar ribs. A plurality of threaded apertures 216 are disposed on housing 202 for receiving fastening bolts 218 which are used to fasten left exterior cap 204, right exterior cap 206, left case member 208, and/or right case member 210 together.

Figure 10:
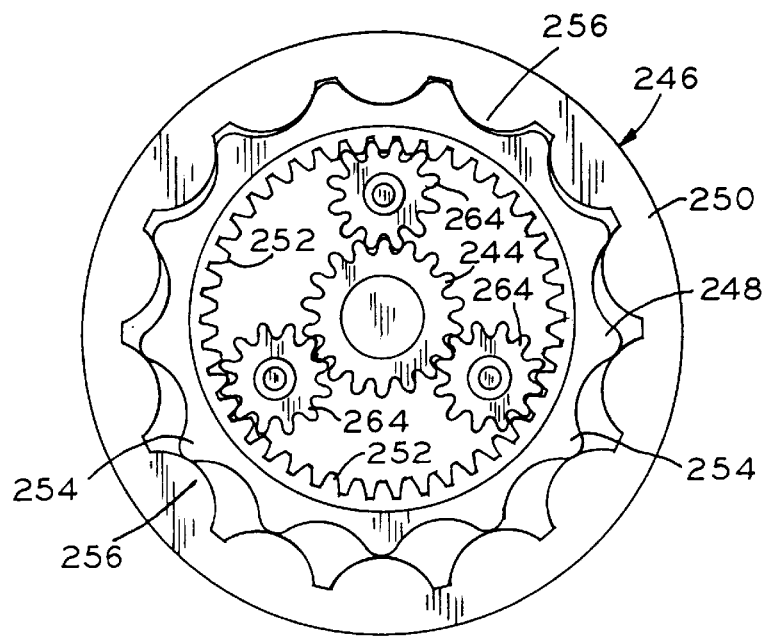
FIG. 10 is a plan view of the gerotor pump and epicyclic gear system used in the embodiment of FIG. 8.

Referring primarily now to FIGS. 8–10, rotational power from an engine such as engine 1c (FIG. 27) is transmitted to input shaft 220, which is rotatably journalled in housing 202. Bevel gear 224 is disposed at the bottom of input shaft 220. As shown in the drawings, bevel gear 224 is formed integrally with input shaft 220, but could be formed from a separate component which is fixedly mounted, such as by one or more keys and/or splines, to input shaft 220, if desired. When rotating, input shaft 220 and bevel gear 224 are characterized by an axis of rotation 222.

Transaxle 200 includes counter shaft 226 having a first end 228 rotatably journalled in left exterior cap 204 and a second end 230 rotatably journalled in right exterior cap 206. The interface between first end 228 and left exterior cap 204 is provided with needle bearings 234. Similarly, the interface between second end 230 and right exterior cap 206 is provided with needle bearings 235.

A first power transmitting gear 232 is disposed on a central portion of counter shaft 226. When rotating, counter shaft 226 and first power transmitting gear 232 share common axis of rotation 236. As shown in FIG. 9, first power transmitting gear 232 is integrally formed with counter shaft 226 but could be formed from a separate component which is fixedly mounted, such as by one or more keys or splines or the like, to counter shaft 226, if desired. Input shafts 220 and counter shaft 226 are shown in a preferred orientation in which axis of rotation 222 of input shaft 220 is substantially perpendicular to axis of rotation 236 of counter shaft 226.

Transaxle 200 includes a first drive train system, generally designated as 239, disposed on one side of counter shaft 226 to the left of first power transmitting gear 232 and a second drive train system, generally designated as 271, disposed on the other side of counter shaft 226 to the right of first power transmitting gear 232. The two drive trains are essentially identical except that one drives output shaft or axle 304 in a forward direction, and the other drives axle 304 in a reverse direction. Either drive train system can be selected to correspond to the forward or reverse direction as desired, and such selection will depend mainly upon the manner in which transaxle 200 is installed in an apparatus having components, such as wheels, to be rotatably driven by transaxle 200. Further, first and second drive train systems 239, 271 may be adapted to provide different forward and reverse drive ratios between input shaft 220 and output shaft 304.

Referring now to the first drive train system 239 as shown best in FIGS. 8–10, first rotation input member 240 is rotatably mounted for free-wheeling rotation on counter shaft 226. Thus, first rotation input member 240 is freely rotatable about counter shaft 226 in a manner such that rotation of first rotation input member 240 does not directly cause rotation of counter shaft 226 and vice versa. First rotation input member 240 receives rotational power from bevel gear 224 of input shaft 220. First rotation input member 240 includes beveled gear portion 242 and pinion gear portion 244. First rotation input member 240 is disposed on counter shaft 226 between first end 228 and first power transmitting gear 232 in a manner such that bevel gear 242 operationally engages and is rotatably driven by bevel gear 224 of input shaft 220. First rotation input member 240 shares axis of rotation 236 with counter shaft 226 and first power transmitting gear 232. The interface between first rotation input member 240 and counter shaft 226 is provided with needle bearings 245.

A first gerotor pump mechanism, generally designated as 246, comprises inner gerotor gear 248 and outer gerotor gear 250. Gerotor gears 248 and 250 are disposed in an aperture of left case member 208 in a manner such that the inner gerotor gear 248 is disposed circumferentially around pinion gear portion 244 and the outer gerotor gear 250 is disposed radially outward from inner gerotor gear 248. As seen best in FIGS. 9 and 10, inner gerotor gear 248 and pinion gear portion 244 are spaced apart radially such that the two gears are not in direct contact.

Inner gerotor gear 248 includes gear teeth 252 disposed on the inner periphery of gear 248 as well as lobe-shaped gear teeth 254 disposed on outer periphery of gear 248. Outer gerotor gear 250 includes lobe-shaped gear teeth 256 disposed on the inner periphery of gear 250. Gear teeth 254 and 256 of inner gerotor gear 248 and outer gerotor gear 250 are adapted for intermeshing pumping engagement such that rotation of inner gerotor gear 248 and outer gerotor gear 250 provides a pumping action capable of pumping a flow of fluid along a fluid pathway extending to and from a fluid supply in an analogous fashion to the manner in which gerotor gears 85 and 86 described with reference to transaxle 10 shown in FIGS. 1–7 accomplish a pumping action. Thus, inner gerotor gear 248 and outer gerotor gear 250 have a resistance to rotation which can be variably controlled in a continuous range extending from a first condition in which inner gerotor gear 248 and outer gerotor gear 250 are freely rotatable to a second condition in which gerotor gears 248 and 250 are locked up and unable to rotate. The resistance to rotation of inner gerotor gear 248 and outer gerotor gear 250 can be easily controlled and set to any desired value within such continuous range merely by adjusting the flow of fluid being pumped by gerotor gears 248 and 250. As was described above with respect to a mode of operation of transaxle 10 of FIGS. 1–7, transaxle 200 of FIGS. 8–12 uses the resistance to rotation of inner gerotor 248 and outer gerotor gear 250 as a variable brake to control the rotational speed at which transaxle 200 drives wheels drivingly coupled to transaxle 200.

Referring again primarily to FIGS. 8–10, planet gears 264 are disposed in meshing engagement with pinion gear portion 244 and gear teeth 252 of inner gerotor gear 248. Thus, planet gears 264 drivingly couple pinion gear portion 244 and inner gerotor gear 248. Each planet gear 264 is rotatably mounted on a corresponding pin 266 which is received in base plate 270. Base plate 270 is fixedly coupled to counter shaft 226 in a manner such that rotation of base plate 270 about axis of rotation 236 also rotatably drives counter shaft 226 about axis of rotation 236. Rotation of counter shaft 226, in turn, rotatably drives first power transmitting gear 232 at a corresponding speed in a corresponding direction of rotation.

Planet gears 264 have three desirable modes of operation which are analogous to the modes of operation associated with planet gears 101 described with respect to transaxle 10 of FIGS. 1–7. For example, in a first mode of operation, when the resistance against rotation of gerotor gears 248 and 250 is at a minimum, planet gears 264 are capable of rotatably driving inner gerotor gear 248 at a speed corresponding to the rotational speed of pinion gear portion 244. In this mode of operation, planet gears 264 are essentially functioning as idler gears, transferring rotational motion from pinion gear portion 244 to inner gerotor gear 248. At this setting, gerotor gears 248 and 250 are driven at maximum pumping speed. Further, each planet gear 264 freely rotates about its corresponding pin 266, but none of planet gears 264 revolve around the axis of rotation 236 of rotation input member 240. In this mode of operation, first drive train system 239 is effectively in neutral inasmuch as the rotational power of rotation input member 240 is not being transferred to axle 304.

In a second mode of operation, the resistance to rotation of gerotor gears 248 and 250 is increased such that planet gears 264 are only capable of rotatably driving gerotor gears 248 and 250 at a lesser rotational speed than that corresponding to the rotational speed of pinion gear portion 244. In this mode of operation, planet gears 264 will not only rotatably drive inner gerotor gear 248 at such lesser speed, but will also "walk" inside inner gerotor gear 248, i.e., revolve about axis of rotation 236. Because planet gears 264 are coupled to first power transmitting gear 232 by pins 266, base plate 270, and counter shaft 226, the revolution of planet gears 264 about the axis of rotation 236 rotatably drives the first power transmitting gear 232 about axis of rotation 236 at a rotational speed corresponding to the revolution speed of planet gears 264. Inasmuch as first power transmitting gear 232 is operatively coupled to the axle 304, a portion of the rotational power from rotation input member 240 is thus transferred to axle 304. As the resistance to rotation of gerotor gears 248 and 250 is increased, the revolution speed of planet gears 264 about axis 236, and hence the rotational speed of axle 304., are increased. Thus, the rotational speed of axle 304 can be controlled easily by adjusting the resistance to rotation of the inner gerotor gear 248 and outer gerotor gear 250. As will be described in more detail below, such resistance to rotation is easily controlled merely by adjusting the flow of fluid being pumped by inner gerotor gear 248 and outer gerotor gear 250.

In a third mode of operation, the resistance to rotation of gerotor gears 248 and 250 may be adjusted to a sufficiently high level such that planet gears 264 are unable to rotatably drive gerotor gears 248 and 250. At this setting, planet gears 264 revolve about axis of rotation 236 at maximum speed, thus driving axle 304 at maximum speed as well.

Second drive train system 271 is essentially identical in form and function to first drive train system 239, except that second drive train system 271 may be used to rotatably drive axle 304 in the opposite direction from the direction in which axle 304 may be rotatably driven by first drive train system 239. Second drive train system 271 includes second rotation input member 272 which is rotatably mounted for free-wheeling rotation on counter shaft 226 for receiving rotational power from bevel gear 224 of input shaft 220. Thus, second rotation input member 272 is freely rotatable about counter shaft 226 in a manner such that rotation of first rotation input member 272 does not directly cause rotation of counter shaft 226 and vice versa. Second rotation input member 272 includes bevel gear portion 274 and pinion gear portion 276.

Second rotation input member 272 is disposed on counter shaft 226 between second end 230 and first power transmitting gear 232 in a manner such that bevel gear portion 274 operationally engages and is rotatably driven by bevel gear 224 of input shaft 220. Because second rotation input member 272 is on the opposite side of bevel gear 224 relative to first rotation input member 240, bevel gear 224 rotatably drives rotation input members 240 and 272 in opposite directions. As a result, first drive train system 239 is capable of driving axle 304 in one direction, e.g., forward, and second drive train system 271 is capable of driving axle 304 in the opposite direction, e.g., reverse. Second rotation input member 272 shares axis of rotation 236 with counter shaft 226 and first power transmitting gear 232. The interface between second rotation input member 272 and counter shaft 226 is provided with needle bearings 277.

A second gerotor pump mechanism, generally designated as 278, comprises inner gerotor gear 280 and outer gerotor gear 282. Gerotor gears 280 and 282 are disposed in an aperture of right case member 210 in a manner such that the inner gerotor gear 280 is disposed circumferentially around pinion gear portion 276 and the outer gerotor gear 282 is disposed radially outward from inner gerotor gear 280. As seen best in FIG. 9, inner gerotor gear 280 and pinion gear portion 276 are spaced apart radially and therefore do not directly contact each other.

Inner gerotor gear 280 includes gear teeth 284 disposed on the inner periphery of gear 280 as well as lobe-shaped gear teeth 288 disposed on the outer periphery of gear 280. Outer gerotor gear 282 includes lobe-shaped gear teeth 292 disposed on the inner periphery of gear 282. Gear teeth 288 and 292 of inner gerotor gear 280 and outer gerotor gear 282 are adapted for intermeshing pumping engagement such that rotation of inner gerotor gear 280 and outer gerotor gear 282 provides a pumping action capable of pumping a flow of fluid along a fluid pathway extending to and from a fluid supply in an analogous fashion to the manner in which gerotor gears 85 and 86 described with reference to transaxle 10 shown in FIGS. 1–7 accomplish a pumping action.

Referring now to FIGS. 8 and 9, planet gears 296 are disposed in meshing engagement with pinion gear portion 276 and gear teeth 284 of inner gerotor gear 280. Thus, planet gears 296 drivingly couple pinion gear portion 276 and inner gerotor gear 280. Each planet gear 296 is rotatably mounted on a pin 298 which is received in base plate 302. Base plate 302 is fixedly coupled to counter shaft 226 in a manner such that rotation of base plate 302 about axis of rotation 236 also rotatably drives counter shaft 226 about axis of rotation 236. Rotation of counter shaft 226, in turn, rotatably drives first power transmitting gear 232 at a corresponding speed in a corresponding direction of rotation. Planet gears 296 have three desirable modes of operation which are analogous to the modes of operation associated with planet gears 264.

As shown best in FIGS. 8 and 9, axle 304 includes a first end 308 rotatably journalled in housing 202 upon needle bearings 306 and a second end 312 rotatably journalled upon needle bearings 314. Oil seals 316 provide a fluid tight seal between axle 304 and the corresponding portions of housing 202 at which axle 304 extends from housing 202. First power transmitting gear 232 is operationally coupled to axle 304 through second power transmitting gear 318, which is keyed to axle 304 and meshingly engages first power transmitting gear 232. Thus, when first power transmitting gear 232 is rotatably driven by rotation of counter shaft 226, the rotational power of first power transmitting gear 232 is transferred to axle 304 via second power transmitting gear 318. This, in turn, causes axle 304 to rotate at a corresponding speed and in a corresponding direction.

The rotation of input shaft 220 rotatably drives rotation input members 240 and 272 in opposite rotational directions. Because in the practice of the present invention either first rotation input member 240 or second rotation input member 272 can be used to alternatively cause counter shaft 226 to rotate in reverse or forward directions, as desired, axle 304 can be rotatably driven in a forward or reverse direction as desired. For purposes of illustration, it will be assumed that input shaft 220 rotatably drives first rotation input members 240 in a forward direction and second rotation input member 272 in a reverse direction. However, in actual practice, the correspondence between rotation input member 240 and 272 and the forward and reverse directions will depend upon the direction in which input shaft 220 is driven by the engine source, the orientation of transaxle 200 in the equipment in which it is installed, and the like.

Referring primarily now to FIGS. 8, 11 and 12, transaxle 200 includes a fluid pathway system along which a hydraulic fluid, such as oil, is pumped by the pumping action provided by first gerotor pump mechanism 246 and/or second gerotor pump mechanism 278. The pathway system includes interior cavity 322 which is in fluid communication with each of the gerotor pump mechanisms 246 and 278. With respect to first gerotor pump mechanism 246, the fluid pathway system includes a fluid intake passage (not shown) provided in left case member 208, arcuate intake recess 326 provided in the outboard surface 328 of left case member 208, fluid discharge passage 330 provided in left case member 208, and arcuate discharge recess 332 provided in the outboard surface 328 of left case member 208. During pumping action of first gerotor pump mechanism 246, fluid is drawn from interior cavity 322 into first gerotor pump mechanism through the not shown intake passage 324 and arcuate intake recess 326, and fluid is discharged from first gerotor pump mechanism 246 into interior cavity 322 through arcuate discharge recess 332 and fluid discharge passage 330.

Similarly, with respect to second gerotor pump mechanism 278, the fluid pathway system further includes fluid intake passage 334 provided in right case member 210, arcuate intake recess 336 provided in the outboard surface 338 of right case member 210, fluid discharge passage 340 provided in right case member 210, and arcuate discharge recess 342 provided in the outboard surface 338 of right case member 210. During pumping action of second gerotor pump mechanism 278, fluid is drawn from interior cavity 322 into second gerotor pump mechanism through intake passage 334 and arcuate intake recess 336, and fluid is discharged from second gerotor pump mechanism 278 into interior cavity 322 through arcuate discharge recess 342 and fluid discharge passage 340.

As shown best in FIGS. 11 and 12, a cylindrical control rod 344 is provided in control rod aperture 346 in order to provide a valve mechanism for easily controlling the flow of fluid being pumped by each of gerotor pump mechanisms 246 and 278. Control rod 344 includes a first circumferential recess portion 348 which is used to control the flow of fluid discharged through fluid discharge passageway 330 by gerotor pump mechanism 246. Control rod 344 further includes a second circumferential recess portion 350 which is used to control the flow of fluid discharged through fluid discharge passageway 340 by gerotor pump mechanism 278. Control rod 344 is moved axially upward and downward in control rod aperture 346 in order to regulate fluid flow. Generally, from a neutral position in which recesses 348 and 350 are both aligned with fluid discharge passageways 330 and 340, respectively, such that both fluid discharge passageways are fully open (FIG. 12), control rod 344 is moved axially in either direction to gradually close off fluid flow for one discharge passageway while the other passageway remains fully open. This allows the axial position of control rod 344 to be used to control both the forward and reverse rotational speeds of axle 304.

For example, FIG. 12 shows control rod 344 in a neutral position in which fluid flow through the forward and reverse discharge passageways 330 and 340 is at a maximum. As a result, the gerotor gears of both gerotor pump mechanisms 246 and 278 are characterized by a minimum resistance against rotation such that each has a maximum ability to pump fluid from interior cavity 322, through the corresponding gerotor gears, and then back to the interior cavity 322 through the recesses 348 and 350 provided in control rod 344. At this setting, the planet gears 264 and 296 of each drive train system 239 and 271, respectively, rotatably drive the gerotor gears of the corresponding gerotor pump mechanism, but planet gears 264 and 296 do not revolve around axis of rotation 236. Thus, no rotational power from input shaft 220 is transmitted to axle 304.

However, as control rod 344 as shown in the neutral position of FIG. 12 is moved axially upward, fluid flow through the forward discharge passageway 330 is gradually restricted, whereas the fluid flow through the reverse discharge passageway 340 remains fully open. As a result, the reverse drive train 271 remains in neutral, whereas the forward drive train 239 begins to rotatably drive axle 304 in the forward rotational direction. As more of the fluid flow through the forward discharge passageway 330 is restricted, axle 304 is rotatably driven faster and faster. When fluid flow through forward discharge passageway 330 is fully closed off, axle 304 is rotatably driven at the maximum forward speed.

In a similar fashion, as control rod 344 as shown in the neutral position of FIG. 12 is moved axially downward, fluid flow through the reverse discharge passageway 340 is gradually restricted, whereas the fluid flow through the forward discharge passageway 330 remains fully open. As a result, the forward drive train 239 remains in neutral, whereas the reverse drive train 271 begins to rotatably drive axle 304 in the reverse rotational direction. As more of the fluid flow through the reverse discharge passageway 340 is restricted, axle 304 is rotatably driven faster and faster. When fluid flow through reverse discharge passageway 340 is fully closed off, axle 304 is rotatably driven at the maximum reverse speed.

Figure 14:
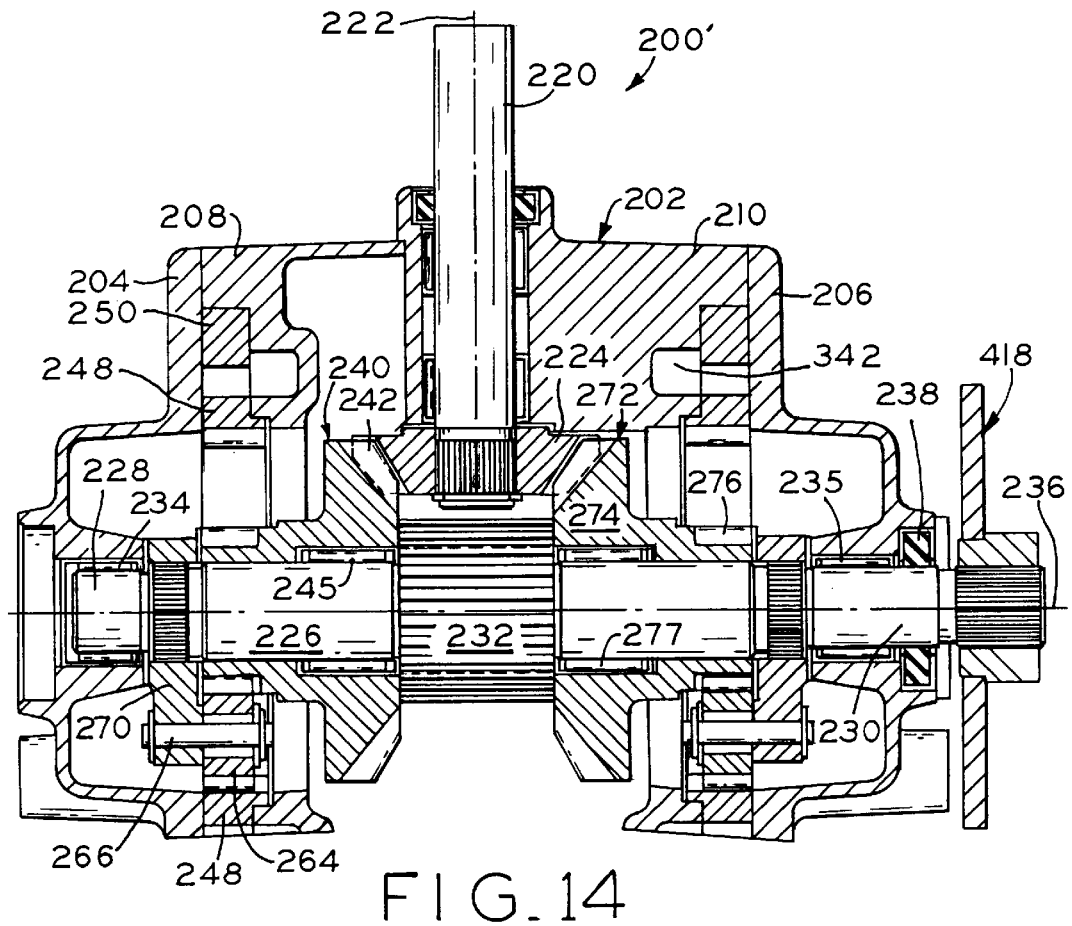
FIG. 14 is a side sectional view of the embodiment of FIG. 13 taken along line 14—14 in the direction of the arrows.

A third embodiment of a transaxle configured in accordance with the present invention is shown in FIGS. 13—14 and is generally designated 200'. With two exceptions, transaxle 200' of FIGS. 13–14 is identical in all respects to transaxle 200 of FIGS. 8–12, and therefore similar parts are similarly referenced. One difference is that transaxle 200' of FIGS. 13–14 includes differential 400 in place of second power transmitting gear 318. Differential 400 includes ring gear 402 meshed with first power transmitting gear 232, a transverse shaft 404, and bevel gears 406, 408, 410, and 412, which are drivingly connected to axles 304' and 305. As a second difference, transaxle 200' of FIGS. 13–14 includes disc brake assembly 418 disposed at the second end 230 of counter shaft 226. Disc brake assembly 418 is of a conventional type, being similar to the brake assembly described in U.S. Pat. No. 3,812,735. Transaxle 200' is adaptable for use in applications such as, for example, a lawn and garden tractor or riding lawn mower 6 as shown in FIG. 26. Riding lawn mower 6 comprises engine 1b as the drive source for transaxle 200', drive wheels 2b and at least one rotatable blade 4b.

A fourth embodiment of the present invention is shown in FIGS. 15–21. The exterior of transaxle 500 comprises upper housing part 502, lower housing part 504 and base plate 506, fastened together with bolts 507, 508, as best seen in FIG. 16. Modular pump assembly 510 is subassembled onto base plate 506 and further comprises first center plate 512, control plate 514, second center plate 516 and top plate 518, arranged in stacked fashion on base plate 506 and secured thereto with a plurality of bolts 520. Plates 506, 512, 514, 516 and 518 are maintained in proper alignment through the use of a pair of dowel pins 519 closely fitted in receiving holes provided through control plate 514 and center plates 512, 516. Pins 519 are axially retained within closely fitted receiving recesses in base plate 506 and top plate 518.

Within pump assembly 510 are first gerotor pump 522 and second gerotor pump 524, located on opposite sides of control plate 514. First gerotor pump 522, arranged between base plate 506 and control plate 514, comprises first outer gerotor gear 526 having a plurality of inner lobes 528 configured as shown in the above embodiments; e.g. inner lobes 528 correspond to inner lobes 97 of outer gerotor gear 86 shown in FIG. 2. First outer gerotor gear 526 has cylindrical outer peripheral surface 530 which interfaces cylindrical inner peripheral surface 532 of first center plate 512. Surfaces 530 and 532 closely interfitted and in sliding engagement, with gear 526 rotatable inside fixed center plate 512. Disposed within first outer gerotor gear 526 is first inner gerotor gear 534 having a plurality of outer lobes 536 configured as shown in the above embodiments; e.g. outer lobes 536 correspond to outer lobes 91 of inner gerotor gear 85 shown in FIG. 2. Inner lobes 528 intermesh with outer lobes 536, the rotational axis of first outer gerotor gear 526 parallel to and offset from that of first inner gerotor gear 534. Gerotor gears 526 and 534 are flat and equivalent in height to first center plate 512. First side 538 of first outer gerotor gear 526 and first side 540 of first inner gerotor gear 534 slidably engage flat interior surface 542 of base plate 506. Second side 544 of first outer gerotor gear 526 and second side 546 of first inner gerotor gear 534 slidably engage flat first surface 548 of control plate 514.

Second gerotor pump 524 is arranged between flat second surface 550 of control plate 514, which is parallel to surface 548 thereof, and flat first surface 572 of top plate 518. Second gerotor pump 524 comprises flat second outer gerotor gear 552 having inner lobes 558 and cylindrical outer peripheral surface 554, and may be identical to gear 526, described above. Surface 554 slidably engages cylindrical inner peripheral surface of second center plate 516, which may be identical to first center plate 512, gear 552 rotating within center plate 516. Flat second inner gerotor gear 560 comprised outer lobes 562 configured as are outer lobes 536 of first inner gerotor gear 534, described above. Lobes 562 of second inner gerotor gear 560 are intermeshed with lobes 558 of outer gerotor gear 552, the axis of rotation of second outer gear 552 parallel to and offset from the axis of rotation of second inner gerotor gear 560. Gerotor gears 552 and 560 are flat and equivalent in height to second center plate 516. First side 564 of second outer gerotor gear 552 and first side 566 of second inner gerotor gear 560 slidably engage flat second surface 550 of control plate 514. Second side 568 of second outer gerotor gear 552 and second side 570 of second inner gerotor gear 560 slidably engage flat first surface 572 of top plate 518. First outer gerotor gear 526 and second outer gerotor gear 552 are coaxial. First inner gerotor gear 534 and second inner gerotor gear 560 are coaxial with input shaft 574.

Referring to FIG. 16, input shaft 574, which is coupled to a drive source such as an internal combustion engine may be provided with a driving pulley (not shown) at its first end 575, extends through journal 503 of upper housing part 502, rotatably supported therein by needle bearings 577. Oil seal 581 is disposed about first shaft end 575 and is seated in journal 503. Opposite first end 575 is second shaft end 576, journaled in needle bearing 578 which may be press fitted into aperture 580 in base plate 506. Aperture 580 extends through base plate 506, and needle bearing 578 is provided with housing 579 which prevents fluid leakage across the cylindrical wall surface of aperture 580 or through bearing 578 to the outside of transaxle 500. Alternatively, base plate 506' (not shown) may be provided with recess 580' (not shown) in which a through bearing such as 577 and second shaft end 576 are disposed, recess 580' located only in the central interior surface of base plate 506'.

Second shaft end 576 extends through annular thrust bearing 582 and annular spacer 584, which are disposed between pinion gear portion 586 and snap ring groove 587 of input shaft 574. First inner gerotor gear 534 is provided with center through hole 535, coaxial with its axis of rotation and having annular step 537 in first side 540, adjacent base plate 506. The outside diameter of thrust bearing 582 is received in annular step 537 and spacer 584 is received in hole 535. Snap ring 589 fitted in groove 587 axially secures spacer 587, thrust bearing 582 and first inner gerotor gear 534 to shaft 574.

First inner gerotor gear 534 is provided with a plurality of axially oriented holes 590 equally distributed about its axis of rotation. In the shown embodiment, three holes 590 are provided in gear 534. Pins 588 press fitted into holes 590 extend from second side 546. First planet gears 592 are disposed upon pins 588 and rotate thereabout, each of planet gears 592 intermeshed with pinion gear portion 586 of input shaft 574. Ring gear 594 is disposed over planet gears 592, abutting second side 546, internal ring gear teeth 599 intermeshing with each planet gear. Rotatable ring gear 594 has cylindrical outer peripheral surface 598 disposed within cylindrical inner peripheral surface 600 of nonrotatable control plate 514. Ring gear 594 is provided with axial surface 596 opposite inner gerotor gear second surface 546, axial surface 596 having central opening 597 through which shaft pinion portion 586 freely extends, and a plurality of holes 602 equally distributed about opening 597. In the shown embodiment, six holes 602 are provided in axial ring gear surface 596. Short pins 603 and long pins 604 fixed in alternating holes 602 extend axially from surface 596. In the shown embodiment, each long pin 604 is provided with rotatable second planet gear 610, which intermeshes with pinion portion 586 of shaft 574. The end of long pin 604 is press fitted into axial receiving hole 608 in carrier 606. Interposed between second planet gears 610 are legs 605 of carrier 606, which abut ring gear axial surface 596. Each leg 605 is provided with hole 609 into which is press fitted the end of short pin 603. Thus, carrier 606 rotates with ring gear 594.

Carrier 606 extends axially through the central aperture of second inner gerotor gear 560, which comprises ring gear 612, and central aperture 614 of top plate 518. Ring gear 612 intermeshes with each second planet gear 610.

Carrier 606 is provided with axial surface 607 opposite ring gear surface 596. Surface 607 is provided with splined central through hole 616 into which is received mating splined portion 618 of worm gear 622. Thus, worm gear 622 rotates with carrier 606 and ring gear 594. Also integral to worm gear 622 and axially adjacent worm gear splined portion 618 is threaded driving worm portion 620, shown having left-hand threads. Worm gear 622 is provided with an axial bore 624 through which extends shaft 574. Needle bearings 626 radially support worm gear 622 about shaft portion 619. Worm gear 622 is axially retained on shaft portion 619 by annular thrust bearings 628, 629 which abut its opposite ends. Thrust bearing 628 is disposed about shaft portion 619, sandwiched between shaft pinion gear portion 586 and the axial end of worm gear splined portion 618. Thrust bearing 629 is disposed about shaft portion 619, sandwiched between the axial end of worm gear portion 620 and the upper housing part interior at the axial end of journal 503. Snap ring 630, received in annular shaft groove 631, retains adjacent thrust bearing 629, worm gear 622, carrier 606 and ring gear 598 to shaft 574 as pump assembly 510 is subassembled.

As shown in FIGS. 19 and 20A, control plate 514 comprises valve body 632 having bore 654 in which elongate sliding valve 634 is disposed. First control plate surface 548 and second control plate surface 550 are each provided with arcuate ports 636, 638 and 640, 642, respectively. The arrangement of inner lobes 558 of second outer gerotor gear 552 and outer lobes 562 of second inner gerotor gear 560 relative to second control plate surface 550 is indicated in FIG. 19. Although not shown, inner lobes 528 of first outer gerotor gear 526 and outer lobes 536 of first inner gerotor 534 are similarly arranged relative to first control plate surface 548, and for the purposes of the following discussion may be considered to directly underlie lobes 558 and 562 in FIG. 19.

The housing assembly interior of transaxle 500 defines sump 549 which is provided with a suitable incompressible fluid such as oil (not shown) which lubricates moving elements and serves as a working fluid for first and second gerotor pumps 522, 524. Referring to FIG. 19, arcuate intake port 642 is in fluid communication with sump 549 through passage 644 provided in control plate surface 550. Thus the fluid may be introduced between lobes 558, 562. The space between lobes 558, 562 is in fluid communication with both arcuate ports 640 and 642. Arcuate exhaust port 640 has, near its end proximate the region where lobes 558, 562 intermesh, round exhaust hole 650 which opens to valve body bore 654. Thus valve body 632 is in fluid communication with passage 644. Note that the vertical fluid level in sump 549 must be adequate to feed intake passage 644, located in top surface 550 of control plate 514.

Similarly, valve body 632 is in fluid communication with passage 646 provided in first surface 548 of control plate 514. It can be understood that fluid from sump 549 may be introduced through passage 646 to arcuate intake port 636 of first gerotor pump 522, between inner lobes 528 of first outer gerotor gear 526 and lobes 536 of first inner gerotor gear 534 to arcuate exhaust port 638 to round exhaust hole 648, which opens to valve body bore 654. Note that the location of intake and exhaust passages 648, 650 from first and second gerotor pumps 522, 524 corresponds with the pumps rotation in opposite directions, as will be discussed below. Control plate 514 is provided with rather large radial exhaust port 652 intersecting valve bore 654 centrally between round exhaust holes 648, 650. Exhaust port 652 provides access for lever 664 of shift rod 666 to engage and move valve 634, and allows fluid to exit valve body 632 and return to sump 549.

Elongate valve 634 is generally cylindrical and slides in valve bore 654. Referring to FIG. 20A, it can be seen that valve 634 comprises left, center and right large diameter sections 656, 658 and 660, interconnected by smaller diameter sections 657, 659. The diameters of sections 656, 658, 660 are equivalent and sized to provide close, sliding engagement with bore 654. The diameters of sections 657, 659 are equivalent and sized to provide substantial clearance to bore 654, such that fluid may flow through the clearance space easily. Tapered sections 668, 670 provide transition surfaces from center large diameter section 658 to small diameter sections 657, 659, respectively. Referring to FIGS. 21A–21C, radial exhaust port 652 is substantially larger in diameter than bore 654. The lengths of each cylindrical section 656-659 and tapered section 668, 670 are such that valve 634 slides from its extreme left hand position (FIG. 21A), where the diameter of section 658 engages bore 654 to the left of exhaust port 652, closing fluid communication between round exhaust hole 648 and exhaust port 652 and opening fluid communication between round exhaust hole 650 and exhaust port 652, to its extreme right hand position (FIG. 21C), where the diameter of section 658 engages bore 654 to the right of exhaust port 652, closing fluid communication between round exhaust hole 650 and exhaust port 652 and opening fluid communication between round exhaust hole 648 and exhaust port 652. When valve 634 assumes its center position (FIG. 21B), section 658 is disposed wholly within the diameter of exhaust port 652 and tapered sections 668, 670 provide substantial clearance to the edges of bore 654 at their junctions with exhaust port 652, thus allowing fluid communication between both round exhaust holes 648, 650 and radial exhaust port 652.

Referring now to FIG. 20B, valve body 632 is provided with first chamber 672 adjacent one end of bore 654 and second chamber 674 adjacent first chamber 672. Second chamber 674 opens to the outside peripheral surface of control plate 514, and valve 634 will be assembled into valve body 632 therethrough, as discussed below. First and second chambers 672, 674 are generally cylindrical, with the diameter of first chamber 672 substantially larger than that of bore 654, and the diameter of second chamber 674 substantially larger than that of first chamber 672. Annular shoulder 676 is formed at the juncture of chambers 672, 674. Near its open end, opposite shoulder 676, the cylindrical surface of second chamber 674 is provided with annular groove 678.

Valve 634 is provided with end portion 680 adjacent section 660 and of approximately equivalent diameter. Separating end portion 680 and section 660 in valve 634 is first annular groove 681 in which is received first snap ring 682 having outer diameter substantially less than the diameter of first chamber 672. Alternatively, first groove 681 and first snap ring 682 may be replaced by an annular bead (not shown) projecting from the surface of valve 634 between section 660 and end portion 680, having an outer diameter approximately that of first snap ring 682 as described. First washer 686 having outer diameter somewhat less than that of second chamber 674 but greater than that of first chamber 672 is disposed about valve portion 680, adjacent first snap ring 682. One end of compression spring 688, which is disposed about valve portion 680, abuts first washer 686. Second washer 690, identical to first washer 686, is disposed about valve portion 680, abutting the other end of spring 688. Second snap ring 692 is received in second annular groove 684 near the free end of portion 680, adjacent second washer 690. Thus, washers 686, 690 and spring 688 are retained between first and second snap rings 682, 692 on valve portion 680 and are subassembled thereto prior to inserting valve 634 into valve body 632. Once valve 634 has been assembled with first and second snap rings 682, 692, first and second washers 686, 690 and spring 688, it is inserted through second chamber 674 into valve body 632. Third snap ring 694 is disposed in groove 678, abutting second washer 690, to retain the valve assembly in the valve body. The inside diameter of third snap ring 694 is substantially larger than the outside diameter of second snap ring 692, thereby allowing valve portion 680 and second snap ring 692 to freely move axially through the center of third snap ring 694.

As seen in FIG. 20A, center valve section 658 is provided with radial hole 662 which is engaged by the end of shift rod lever 664. Rotation of shift rod 666 clockwise or counterclockwise from its position shown in FIG. 15 slides valve 634 within valve body 632 from its centered position against the force of spring 688. Referring now to FIGS. 20B and 21A–C, as valve 634 is moved towards the left from center (FIG. 21A), first washer 686 remains abutted against shoulder 676, thus spring 688 compresses between the distance between fixed shoulder 676 and second snap ring 692. As valve 634 is moved towards the right from center (FIG. 21C), second washer 690 remains abutted against third snap ring 694, thus spring 688 compresses between the distance between first snap ring 682 and fixed third snap ring 694. With no clockwise or counterclockwise torque exerted on shift rod 666 to oppose the force of spring 688, valve 634 is urged into its centermost position (FIG. 21B) by spring 688.

Referring again to FIG. 15, transaxle 500 further comprises brake shaft 702, driven worm gear 706, spur gear 708, differential 712 which drives first and second axles 714, 716, and disc brake assembly 718 located outside the transaxle housings and attached to brake shaft 702. Disc brake assembly 718 is of a conventional type, being similar to the brake assembly described in U.S. Pat. No. 3,812,735. Brake shaft 702 and axles 714, 716 are disposed at the parting lines of upper housing part 502 and lower housing part 504. FIG. 15 shows upper surface 720 of lower housing part 504, which interfaces lower surface 722 of upper housing part 502 (FIG. 16). First clamp bracket 724 secures first end 728 of brake shaft 702 to an interior boss in upper housing part 502. Similarly, second clamp bracket 726 secures second axle 716 to interior boss 730 upper housing part 502 (FIG. 16). Oil seals 732 are disposed about brake shaft 702 and each axle 714, 716 near the points where they extend from the housing assembly, and brake shaft 702 is journalled in needle bearings 734, 736 at the housing sidewalls and at clamp bracket 724, respectively.

As best seen in FIG. 15, brake shaft 702 comprises several sections: first splined section 738, to which the rotating brake member of brake assembly 718 is coupled; journalled section 740, radially supported by needle bearing 734 and about which oil seal 732 is disposed; second splined section 742, to which spur gear 708 is adapted to rotate with shaft 702; large diameter section 744, the end of which, opposite second splined section 742, comprises third splined section 746; and small diameter section 748, comprising journalled first end 728. Freely rotatable about small diameter section 748 is disconnect sleeve 750 having splined exterior surface 752 to which is rotatably coupled splined inner periphery 754 of driven worm gear 706. Sleeve 750 is maintained in its axial position on small diameter shaft section 748 by spacer 756 and thrust bearing 758 disposed between spacer 756 and clamp bracket 724 and its mating boss. Spur gear 708 abuts the shoulder formed between second splined section 742 and large diameter shaft section 744 on one side and thrust bearing 760 on the other side, thrust bearing 760 disposed between spur gear 708 and the housing inner side wall.

Cylindrical shift collar 762 is disposed about brake shaft 702 and has splined inner surface 764 which is rotatably coupled to brake shaft third splined section 746, such that shaft 702 rotates with collar 762. Collar 762 is slidable along shaft splined section 746 such that it may be completely disposed over the shaft splines or, as shown in FIG. 15, may partially extend beyond shaft splined section 746 so as to engage splined outer surface 752 of disconnect sleeve 750. Thus, by maintaining the position of collar 762 completely over shaft splined portion 746, the rotation imparted by driving worm gear portion 620 to driven worm gear 706 and disconnect sleeve 750 is not transferred to brake shaft 702. By sliding collar 762 along spined portion 746 of shaft 702 such that the collar's inner splined surface 764 also engages outer splined surface 752 of disconnect sleeve 750, rotation imparted by driving worm gear portion 620 to driven worm gear 706 and disconnect sleeve 750 is transferred to brake shaft 702 and to the remainder of the geartrain, as will be further discussed below.

Shift collar 762 is provided on its outer surface with annular groove 766 in which pin 768 of disengagement fork 770 slides. By rotating disengagement rod 772 clockwise as viewed in FIG. 15, pin 768 slidably engages one side of groove 766, forcing collar 762 into its disengaged position completely over splined section 746 of brake shaft 702. Compression spring 774 is provided about large diameter section 744 of brake shaft 702, abutting spur gear 708 at one end and shift collar 762 at the other end. Spring 774 thus urges collar 762 into its engaged position, in which its splined inner surface 764 engages splined outer sleeve surface 752 as well as splined brake shaft section 746. Disengagement rod 772 extends through upper housing part 502 as shown in FIG. 16 and may be is provided with a handle (not shown) for its easy rotation. The disengagement rod handle may be provided with means for holding collar in its disengaged position against the force of spring 774.

Rotation imparted to brake shaft 702 through collar 762 is transferred to spur gear 708 through second splined shaft section 742. The spur gear teeth intermesh with those of differential ring gear 710, the inner periphery of which is provided with diametrical cross shaft 776, which is adapted to rotate with ring gear 710. Rotatably disposed about cross shaft 776 are a first pair of bevel gears 778 which intermesh with a second pair of bevel gears 780. Axles 714, 716 have splined sections 782, 784 which rotatably engage second bevel gears 780. Axles 714, 716 abut cross shaft 776 and are prevented from axial movement away from each other by c-rings 786 disposed in annular groove 788 in each axle. Bevel gears 780 are maintained in their axial positions by their engagement with bevel gears 778 and by abutting second clamp bracket 726 and the interior wall of the housing assembly through thrust washers 790. Axles 714, 716 are adapted to transfer torque to the drive wheels of an implement into which transaxle 500 is installed, such as wheels 2b of rider mower 6 (FIG. 26), for example.

Notably, brake shaft 702, its attendant components, differential 712 and axles 714, 716 may be subassembled to upper housing part 502 before part 502 is assembled to lower housing part 504 and fastened with bolts 507. Further, pump assembly 510 (FIG. 17) may be installed into transaxle 500 after the upper housing part subassembly has been assembled to lower housing part 504, pump assembly baseplate 506 fastened to lower housing part 504 with bolts 508.

Once pump assembly 510 has been incorporated into transaxle 500, driven worm gear 706 is intermeshed with driving worm portion 620 of worm gear 622, providing the driving link between pump assembly 510 and the remainder of the transaxle geartrain. Notably, the thread pitch of driving worm portion 620 is such that although forward or reverse rotation can be imparted by worm portion 620 to driven worm gear 706, driven worm gear 706 cannot impart rotation in either direction to worm portion 620. Thus, with collar 762 in its engaged position, an implement incorporating transaxle 500 will be unable to roll downhill unpowered or at an undesirably high rate of speed, providing improved implement safety.

In operation, transaxle 500 is coupled to an external drive source, such as internal combustion engine 1b (FIG. 26), which continuously rotates input shaft 574 at a constant speed in one direction. In the depicted embodiment, shaft 574 is rotated clockwise as viewed in FIG. 15, although it will be understood that transaxle 500 may be adapted to operate with shaft 574 rotated counterclockwise.

Initially, it will be assumed that valve 634 is in its centered position in valve body 632 (FIG. 21B). Thus the transaxle is in neutral and fluid is permitted to flow from both first and second gerotor pumps 522, 524 through exhaust port 652. In this configuration, worm gear 622 is not caused to rotate. Referring to first gerotor pump 522, in neutral, input shaft 574 rotates inside nonrotating ring gear 594. First planet gears 592, driven by pinion gear portion 586 of shaft 574, rotate on pins 588 and are caused to walk about ring gear 594, revolving in a clockwise direction about the axis of input shaft 574, i.e., in the direction of shaft rotation. Thus, pins 588 induce a clockwise rotational movement of first inner gerotor gear 534, to which they are fixed. Rotating first inner gerotor gear 534 causes, through intermeshed lobes 528, 536, first outer gerotor gear 526 to rotate within first center plate 512 and fluid to be pumped through first gerotor pump 522 in the manner described above.

Similarly, referring to second gerotor pump 524, in neutral, as input shaft 574 rotates inside nonrotating carrier 606, rotating second planet gears 610, driven by pinion gear portion 586 of shaft 574, rotate in place about long pins 604, inducing rotational movement of second inner gear 560, via its integral ring gear 612, in a counterclockwise direction, i.e., in the direction opposite that in which shaft 574 rotates. Rotating second inner gerotor gear 560 causes, through intermeshed lobes 558, 562, second outer gerotor gear 552 to rotate within second center plate 516 and fluid to be pumped through second gerotor pump 524 in the manner described above.

As valve 634 is moved towards the left from its neutral position shown in FIG. 21B, the passage from first gerotor pump 522 to exhaust port 652 becomes restricted and the fluid flow rate through first gerotor pump 522 slows down. Thus, the backpressure of the incompressible fluid on lobes 528, 536 increases the load thereon, slowing the rotational movement of first outer and inner gerotor gears 526, 534. As inner gerotor gear 534 slows, the rate at which first planet gears 592 revolve about rotating shaft 574 also slows, imparting rotational movement to ring gear 594 in the direction opposite that of rotating shaft 574, i.e., ring gear 594, carrier 606 and worm gear 622 rotate in the counterclockwise direction. Driven worm gear 706 and disconnect sleeve 750 are thus caused to rotate in the clockwise direction as viewed in FIG. 16 by left-hand threaded worm portion 620 about small diameter brake shaft section 748. (A right hand threaded worm portion (not shown) would cause driven worm gear 706 to rotate in a counterclockwise direction as viewed in FIG. 16.) Meanwhile, as shown in FIG. 21A, fluid continues to flow freely from second gerotor pump 524 to exhaust port 652.

As valve 634 continues to move towards the left, the restriction on fluid flow through first gerotor pump 522 continues to increase, causing ring gear 594 to rotate at increasing speeds in the counterclockwise direction, with full forward speed achieved, for a given input shaft 574 speed, when valve 634 reaches the fully closed position shown in FIG. 21A. Thus it can be seen that with shift collar 762 is in its engaged position (FIG. 15), the forward speed of an implement incorporating transaxle 500 will increase with movement of valve 634 leftward from its neutral position.

As valve 634 is moved towards the right from its neutral position shown in FIG. 21B, the passage from second gerotor pump 524 to exhaust port 652 becomes restricted and the fluid flow rate through first gerotor pump 524 slows down. Thus, the backpressure of the incompressible fluid on lobes 558, 562 increases the load thereon, slowing the rotational movement of second outer and inner gerotor gears 552, 560. As inner gerotor gear 560 slows, the rate at which second planet gears 610 revolve about rotating shaft 574 increases, imparting rotational movement to carrier 606 via long pins 604 in the direction of rotating shaft 574, i.e., carrier 606 and worm gear 622 rotate in the clockwise direction. Driven worm gear 706 and disconnect sleeve 750 are thus caused to rotate in the counterclockwise direction as viewed in FIG. 16 by left-hand threaded worm gear portion 620 (or in a clockwise direction by a right-hand threaded worm gear portion (not shown)) about small diameter brake shaft section 748. Meanwhile, as shown in FIG. 21C, fluid continues to flow freely from first gerotor pump 522 to exhaust port 652.

As valve 634 continues to move towards the right, the restriction on fluid flow through second gerotor pump 524 continues to increase, causing carrier 606 to rotate at increasing speeds in the clockwise direction, with full reverse speed achieved, for a given input shaft 574 speed, when valve 634 reaches the fully closed position shown in FIG. 21C. Thus it can be seen that with shift collar 762 is in its engaged position (FIG. 15), the reverse speed of an implement incorporating transaxle 500 will increase with movement of valve 634 rightward from its neutral position.

Thus it can be understood that the braking of each pump 522, 524, by restricting the fluid flow therethrough, allows the respective counterclockwise or clockwise rotation of worm gear 622 to be induced by clockwise rotating shaft 574. Further, it is to be understood that transaxle 500 may be adapted to provide different forward and reverse drive ratios between input shaft 574 and worm gear 622.

Figure 22:
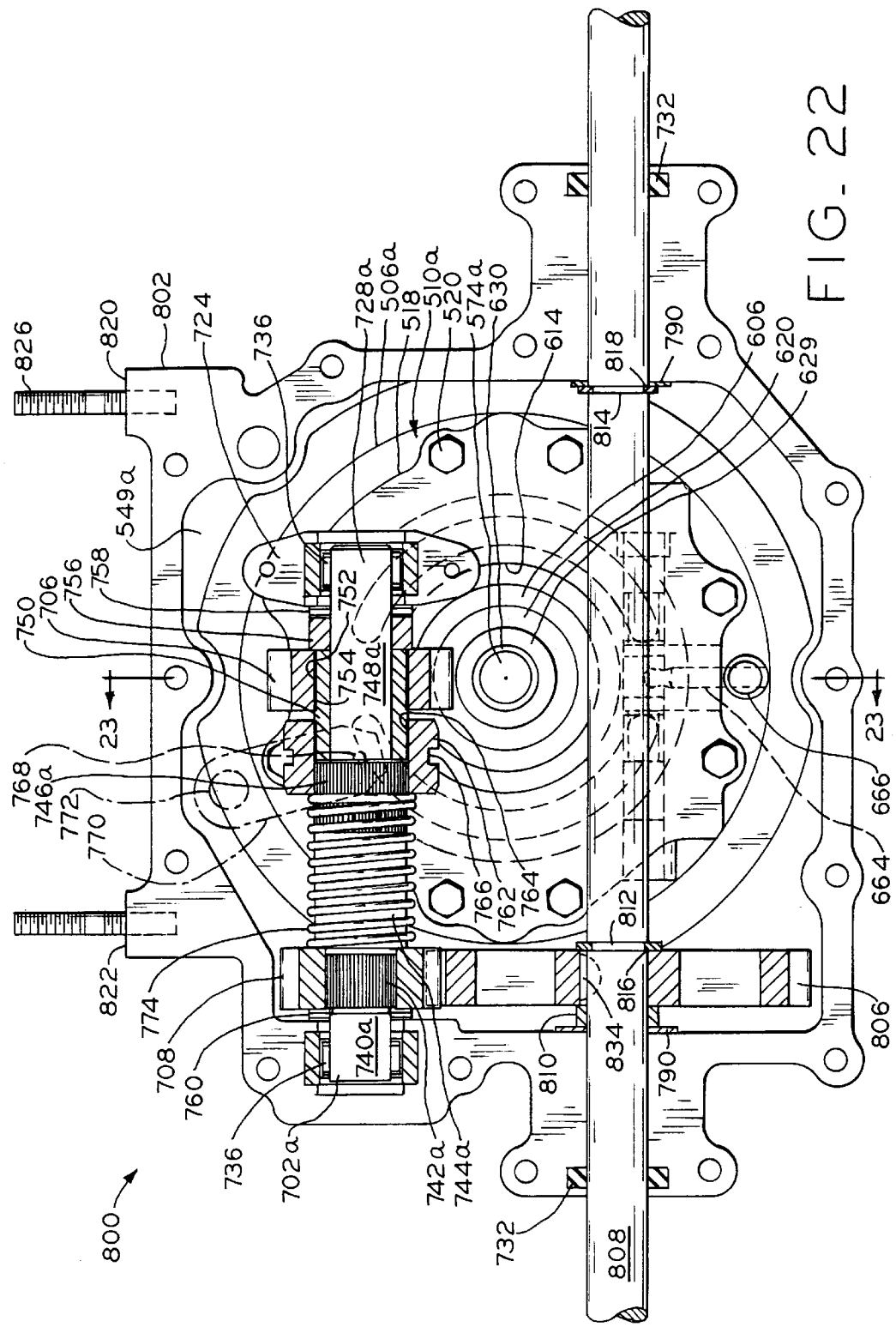
FIG. 22 is a rear sectional view of a variable speed transaxle according to a fifth embodiment of the present invention, also showing the shift collar engaging fork.
Figure 23:
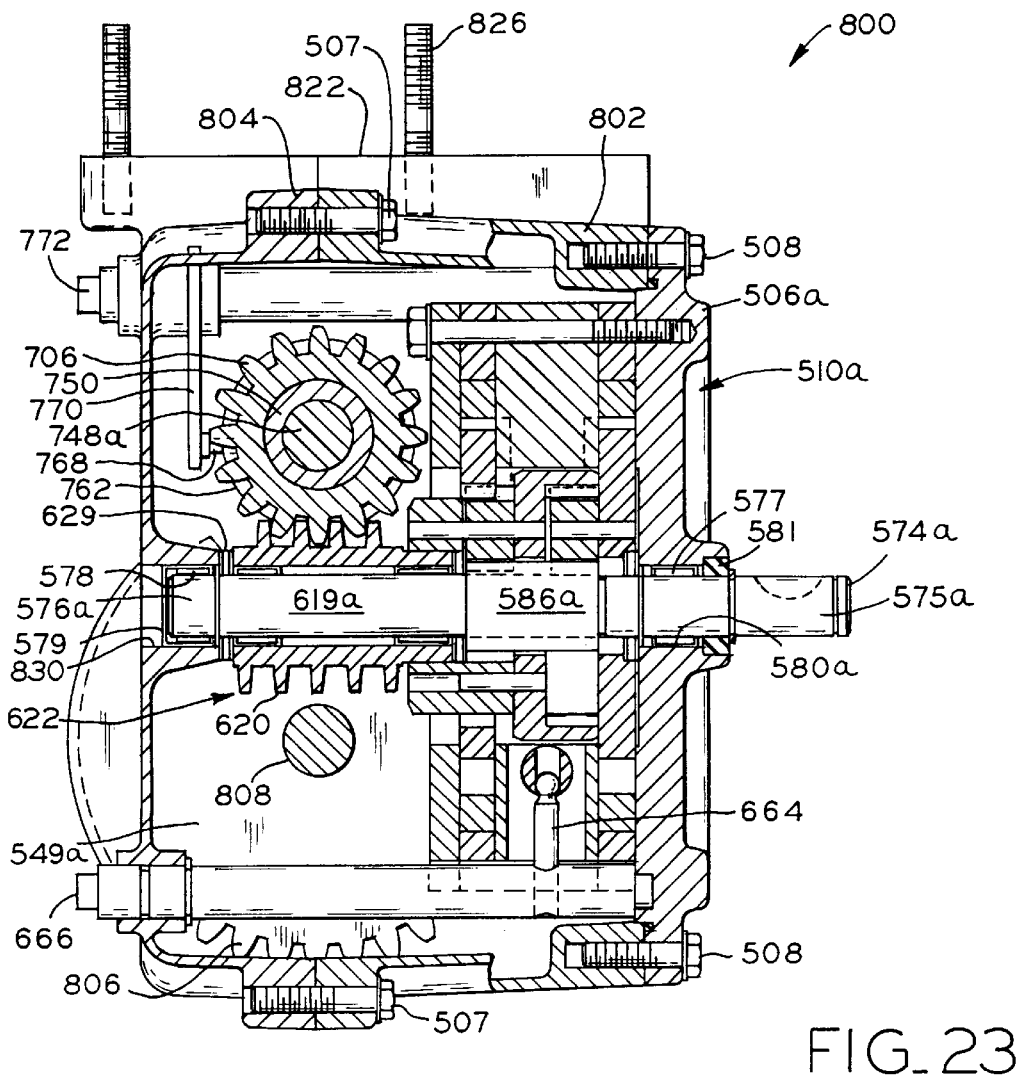
FIG. 23 is a side sectional view of the embodiment of FIG. 22 taken along line 23—23 in the direction of the arrows.

Transaxle 800, shown in FIGS. 22 and 23, is a sixth embodiment of a transaxle according to the present invention. The exterior of transaxle 800 comprises front housing part 802, rear housing part 804 and base plate 506a, which is very similar to base plate 506 of transaxle 500, discussed above. Input shaft 574a (FIG. 18), similar to input shaft 574 of transaxle 500, comprises first end 575a, pinion gear portion 586a, portion 619a and second end 576a. Second shaft end 576a, opposite first end 575a is radially supported in needle bearing 578, which is press fitted into receiving aperture 830 provided in rear housing part 804. Aperture 830 extends through rear housing part 804, and needle bearing 578 is provided with housing 579 which prevents fluid leakage across the cylindrical wall surface of aperture 830 or through bearing 578 to the exterior of transaxle 800. Alternatively, rear housing part 804' (not shown) may be provided with recess 830' (not shown) in which a through bearing such as 577 and second shaft end 576a are disposed, recess 830' located only in the interior surface of rear housing part 804'.

First shaft end 575a projects through base plate aperture 580a, radially supported in needle bearing 577 and provided with annular shaft seal 581. Pinion gear portion 586a is identical to input shaft pinion gear portion 586 of transaxle 500. Similarly, portion 619a is identical to input shaft portion 619 of transaxle 500.

With the exception of its base plate and input shaft, discussed above, pump assembly 510a is identical to pump assembly 510 of transaxle 500 in componentry and operation. Thus, as described above with respect to transaxle 500 and pump assembly 510, the clockwise rotation of input shaft 574a, as viewed in FIG. 22, is transferred into clockwise or counterclockwise rotation of worm gear 622 as first and second gerotor pumps 522, 524 are braked by restricting the fluid flow therethrough. Note that the vertical fluid level of sump 549a must be adequate to feed both fluid intake passages 644, 646 (FIG. 19), located near the topmost interior region of transaxle 800.

Applications into which transaxle 800 would normally be incorporated are propelled at walking speeds or are not easily rolled unless its weight is supported solely by its drive wheels. Therefore, upon being shifted into neutral (valve 634 assuming the position shown in FIG. 21B), implements using transaxle 800, such as, for example, tillers, snow throwers such as snow thrower 5 in FIG. 27, or wide area walk behind mowers, would normally require no additional braking to stop. Therefore, braking means such as brake assembly 718 of transaxle 500 (FIG. 15) are not included in transaxle 800. Further, as is the case with transaxle 500, the thread pitch of driving worm portion 620 is such that although forward or reverse rotation can be imparted by worm portion 620 to driven worm gear 706, driven worm gear 706 cannot impart rotation in either direction to worm portion 620. Thus, with collar 762 in its engaged position, an implement incorporating transaxle 800 will be unable to roll downhill unpowered or at an undesirably high rate of speed, providing improved implement safety. It should be recognized that braking means may be easily incorporated into transaxle 800, however, and the lack thereof in the shown embodiment should not be construed as limiting the scope of the present invention in any way.

As shown in FIG. 22, brake shaft 702a comprises several sections: small diameter section 748a, including first end 728a; large diameter section 744a, including splined section 746a; splined section 742a; and journaled section 740a. It can be seen that brake shaft 702a is radially supported in bearings 736 in a manner similar to brake shaft 702 of FIG. 15 and operates in the same way. Viz., clockwise rotation of driving worm gear portion 620, as viewed in FIG. 22, causes driven worm gear 706 and disconnect sleeve 750 to rotate about small diameter brake shaft section 748a in a counterclockwise direction, as viewed in FIG. 23, and conversely. Further, it is to be understood that transaxle 800 may be adapted to provide different forward and reverse drive ratios between input shaft 574a and worm gear 622.

Provided shift collar 762 is in its engaged position, coupling disconnect sleeve 750 with splined brake shaft portion 746a, the rotation of driven worm gear 702 is transferred to spur gear 708, which is intermeshed with ring gear 806. Ring gear 806 is rotatably coupled to single axle 808 by Woodruff key 834 or, alternatively, by splines (not shown). Axle 808 is rotatably coupled to a pair drive wheels and imparts rotation thereto. Disposed about axle 808 are oil seals 732, seated in front and rear housing parts 802, 804. Spacer 810 spaces ring gear 806 from the interior wall of the housing assembly, abutting one side of the gear. Abutting the other side of ring gear 806 is snap ring 816 received in annular axle groove 812. Thrust washers 790 bearing on the interior wall of the housing assembly retain axle 808 in its axial position, and are disposed adjacent spacer 810 and snap ring 818 received in annular axle groove 814. It is to be understood that transaxle 800 may be adapted to employ two axle halves and a differential, such as axles 714, 716 and differential 712 of transaxle 500 (FIG. 15), in place of solid axle 808 and ring gear 806.

Figure 27:
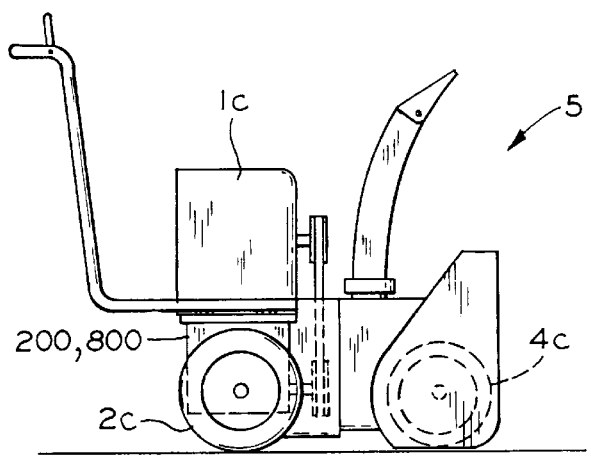
FIG. 27 is perspective view of an implement according to an ninth embodiment of the present invention.

Transaxle 800 is provided, on the top exterior of its housing assembly, with mounting surfaces 820, 822 for mounting an engine such as engine 1c, shown in FIGS. 24 and 27. Referring to FIG. 24, engine 1c is attached with nuts 838 to studs 826 provided in surfaces 820, 822. Thus, engine 1c may be assembled to transaxle 800 to provide engine/transaxle module 850 which may be assembled as a unit into an implement such as, for example, snow thrower 5 of FIG. 27. Engine 1c has horizontal output shaft 840 provided with output pulley 842 affixed thereto. A flexible torque conveying element such as belt 844 drivingly couples engine output pulley 842 and transaxle input pulley 846 affixed to input shaft 874a. Module 850 may or may not comprise the pulleys and the drive belt. Engine 1c may be provided with additional output pulley 852 for driving a device such as, for example, blade 4c of snow thrower 5 (FIG. 27), via second belt 854 and device input pulley 856, rotatably coupled to device input shaft 858. It will be appreciated that transaxle embodiments according to the present invention other than transaxle 800 may be similarly adapted to provide mounting for an engine. Thus, module 850 shown in FIG. 24 should not be construed as limiting the scope of the present invention to that embodiment.

While this invention has been described as having preferred designs, the present invention can be further modified within the spirit and scope of this disclosure. Transmissions and transaxles of the present invention may be equipped with gear trains that use all types of epicyclic gears, including star gears, planetary gears and solar gears. Furthermore, while the pump serving as the variable brake in each of the illustrated transaxles is a gerotor pump, other types of pumps may be employed. For example, a gear pump may be utilized, and the epicyclic ring gear may serve as an internal gear of such a pump. Moreover, the present invention provides modular pump assemblies such as, for example, pump assemblies 510 and 510*a*, which may be incorporated into a system of transaxles or transmissions, transaxles 500 and 800 comprising but two examples of such a system. Therefore, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A self-propelled lawn and garden implement having at least two ground-engaging wheels, a rotatable blade, an engine and a variable speed transmission comprising:

a rotatable input member connectable to the engine;

a rotatable output member connectable to at least one wheel;

a gear train operatively connected to said input member and said output member for transmitting rotational power of said input member to said output member, said gear train comprising an epicyclic gear including a first gear member;

a pump for pumping a fluid through a fluid conduit, said pump including a first element disposed in a fluid engaging position within said fluid conduit, wherein said pump first element comprises said first gear member;

an adjustable valve for varying a resistance to movement of fluid within said fluid conduit between a first resistance level and a second resistance level; and wherein said first gear member revolves at a first speed to cause rotation of said output member at a first rate when said resistance to fluid movement within said fluid conduit is at said first resistance level and said input member rotates at a drive speed, and wherein said first gear member revolves at a second speed to cause rotation of said output member at a second rate when said resistance to fluid movement within said fluid conduit is at said second resistance level and said input member rotates at said drive speed.

2. The implement of claim 1, wherein said first gear member of the transmission comprises a ring gear.

3. The implement of claim 2 wherein said pump of the transmission comprises a gerotor pump, wherein a second pump element comprises an outer gerotor gear, and wherein said ring gear comprises an inner gerotor gear in intermeshing pumping engagement with said outer gerotor gear such that relative rotation between said inner and outer gerotor gears provides a pumping action capable of pumping a flow of fluid through said fluid conduit.

4. The implement of claim 2 wherein said pump of the transmission comprises a gear pump, wherein a second pump element and said ring gear comprise first and second inner gears of said gear pump in intermeshing pumping engagement gear such that rotation of said first and second inner gears provides a pumping action capable of pumping a flow of fluid through said fluid conduit.

5. The implement of claim 2 wherein said gear train of the transmission comprises a pinion gear and at least one planet gear, said pinion gear rotatably fixed to said input member, said at least one planet gear disposed between said pinion gear and said ring gear in a manner such that said at least one planet gear is in meshing engagement with said pinion gear and said ring gear and such that rotation of said input member is capable of causing said at least one planet gear to revolve about an axis of rotation of said pinion gear at a revolution speed variably controllable by adjustment of said adjustable valve.

6. The implement of claim 5 wherein said gear train of the transmission comprises first and second power transmitting gears in meshing engagement, said at least one planet gear rotatably mounted to said first power transmitting gear whereby said first power transmitting gear serves as a rotatable planet carrier, and wherein said second power transmitting gear is rotatably fixed to said output member.

7. The implement of claim 1, wherein said input member of the transmission is connectable to the engine via a flexible torque conveying element.

8. The implement of claim 7, wherein said flexible torque conveying element is a belt.

9. A self-propelled lawn and garden implement having at least two ground-engaging wheels, a rotatable blade, an engine and a variable speed transaxle comprising:

a housing for an internally disposed gear train and an internally disposed pump for pumping fluid along a fluid conduit;

at least one axle shaft rotatably supported in said housing;

an input shaft extending into said housing;

said gear train including an epicyclic gear mechanism and drivingly connected between said input shaft and said at least one axle shaft; and said pump connected to said gear train and operable to vary the speed of rotation of said at least one axle shaft;

wherein said epicyclic gear mechanism includes a first gear member, said first gear member disposed in a fluid engaging position in said fluid conduit.

10. The implement of claim 9 wherein said gear train of the transaxle comprises a differential, and said at least one axle shaft comprises two axle shafts connected to said differential.

11. The implement of claim 9 wherein said pump of the transaxle comprises a gerotor pump.

12. The implement of claim 11 wherein said first gear member comprises a ring gear, wherein said ring gear comprises a radial periphery with lobe-shaped teeth, and wherein said ring gear comprises an inner gerotor gear of said gerotor pump.

13. The implement of claim 9 wherein said pump of the transaxle comprises a gear pump.

14. The implement of claim 9 wherein said transaxle housing defines a sump for fluid transported through said fluid conduit.

15. The implement of claim 9 in which the transaxle further comprises a second gear train and a second pump both internally disposed within said housing, said second gear train including an epicyclic gear mechanism and drivingly connected between said input shaft and said at least one axle shaft to rotate said at least one axle shaft in a second direction opposite to a direction the other gear train rotates said at least one axle shaft, said second pump connected to said second gear train and operable to vary the speed of rotation of said at least one axle shaft in said second direction.

16. The implement of claim 15 in which the transaxle further comprises a counter shaft rotatably supported in said housing and drivingly connected to said at least one axle shaft, said counter shaft operatively connectable to each of said first and second gear trains, said counter shaft disposed parallel to said at least one axle shaft.

17. The implement of claim 9, wherein said transaxle input member is connectable to the engine via a flexible torque conveying element.

18. The implement of claim 17, wherein said flexible torque conveying element is a belt.

19. A variable speed, reversible transmission comprising:
   a rotatable input member connectable to a drive source;
   a output member rotatable in forward and reverse directions;
   a housing;
   a first pump for pumping fluid through a first conduit;
   a second pump for pumping fluid through a second conduit; and
   a gear train comprising a first epicyclic gear train operably connecting said input member and said first pump, a second epicyclic gear train operably connecting said input member and said second pump, and a worm gear intermediate said input member and said output member and rotatable in one of forward and reverse directions in driven response to one of said first and second epicyclic gear trains.

20. The transmission of claim 19, further comprising first and second adjustable valves, said first adjustable valve disposed along said first conduit for varying the resistance to movement of fluid within said first conduit to adjust an operational speed of said first pump, said second adjustable valve disposed along said second conduit for varying the resistance to movement of fluid within said second conduit to adjust an operational speed of said second pump, whereby speeds of rotation of said output member in said forward and reverse directions are controllable.

21. The transmission of claim 20, wherein said first and second adjustable valves comprise different recessed portions of a common control rod.

22. The transmission of claim 19, wherein said first and second pumps comprise separate gerotor pumps.

23. The transmission of claim 22, wherein said second epicyclic gear train comprises a ring gear, wherein said ring gear comprises a radial periphery with lobe-shaped teeth, and wherein said ring gear comprises an inner gerotor gear of said second pump.

24. The transmission of claim 19, wherein said first epicyclic gear train comprises a ring gear operably connecting said first epicyclic gear train with said second epicyclic gear train.

25. A variable speed, reversible transmission comprising:
   a rotatable input member connectable to a drive source;
   an output member rotatable in forward and reverse directions;
   a housing;
   a first pump for pumping fluid through a first conduit;
   a second pump for pumping fluid through a second conduit; and
   a gear train comprising a first epicyclic gear train operably connecting said input member and said first pump, a second epicyclic gear train operably connecting said input member and said second pump;

wherein the drive source is mounted on said housing.

26. The transmission of claim 25, further comprising first and second adjustable valves, said first adjustable valve disposed along said first conduit for varying the resistance to movement of fluid within said first conduit to adjust an operational speed of said first pump, said second adjustable valve disposed along said second conduit for varying the resistance to movement of fluid within said second conduit to adjust an operational speed of said second pump, whereby speeds of rotation of said output member in said forward and reverse directions are controllable.

27. The transmission of claim 26, wherein said first and second adjustable valves comprise different recessed portions of a common control rod.

28. The transmission of claim 25, wherein said first epicyclic gear train comprises a ring gear operably connecting said first epicyclic gear train with said second epicyclic gear train.

29. The transmission of claim 25, wherein said first and second pumps comprise separate gerotor pumps.

30. The transmission of claim 29, wherein said second epicyclic gear train comprises a ring gear, wherein said ring gear comprises a radial periphery with lobe-shaped teeth, and wherein said ring gear comprises an inner gerotor gear of said second pump.

31. At variable speed, reversible transmission comprising:
   an output member rotatable in forward and reverse directions;
   a housing;
   a pump assembly module comprising:
      a rotatable input member connectable to a drive source,
      a first pump for pumping fluid through a first conduit,
      a second pump for pumping fluid through a second conduit,
      a first epicyclic gear train operably connecting said input member and said first pump,
      a second epicyclic gear train operably connecting said input member and said second pump, and
      a worm gear disposed about said input member; and
   a countershaft assembly having first and second gears, said first gear intermeshed with said worm gear, said second gear connected with said output member.

32. The transmission of claim 31, further comprising first and second adjustable valves, said first adjustable valve disposed along said first conduit for varying the resistance to movement of fluid within said first conduit to adjust an operational speed of said first pump, said second adjustable valve disposed along said second conduit for varying the resistance to movement of fluid within said second conduit to adjust an operational speed of said second pump, whereby speeds of rotation of said output member in said forward and reverse directions are controllable.

33. The transmission of claim 32, wherein said first and second adjustable valves comprise different recessed portions of a common control rod.

34. The transmission of claim 31, wherein said first and second pumps comprise separate gerotor pumps.

35. The transmission of claim 34, wherein said second epicyclic gear train comprises a ring gear, wherein said ring gear comprises a radial periphery with lobe-shaped teeth, and wherein said ring gear comprises an inner gerotor gear of said second pump.

36. The transmission of claim 31 wherein said first epicyclic gear train comprises a ring gear operably connecting said first epicyclic gear train with said second epicyclic gear train.

37. A system of variable speed, reversible transmissions comprising:

a rotatable input member connectable to a drive source;

an output member rotatable in forward and reverse directions;

a housing;

a first pump for pumping fluid through a first conduit;

a second pump for pumping fluid through a second conduit;

a gear train comprising:
- a first epicyclic gear train operably connecting said input member and said first pump,
- a second epicyclic gear train operably connecting said input member and said second pump, said first and second epicyclic gear trains interconnected through a carrier,
- a worm gear interconnected with said carrier, and
- a countershaft assembly having first and second gears, said first gear intermeshed with said worm gear, said second gear connected to said output member; and valve means disposed between said first and second pumps for restricting flow through one of said first and second conduits.

38. The transmission of claim 37, wherein said valve means comprises first and second adjustable valves, said first adjustable valve disposed along said first conduit for varying the resistance to movement of fluid within said first conduit to adjust an operational speed of said first pump, said second adjustable valve disposed along said second conduit for varying the resistance to movement of fluid within said second conduit to adjust an operational speed of said second pump, whereby speeds of rotation of said output member in said forward and reverse directions are controllable.

39. The transmission of claim 38, wherein said first and second adjustable valves comprise different recessed portions of a common control rod.

40. The transmission of claim 37, wherein said first and second pumps comprise separate gerotor pumps.

41. The transmission of claim 40, wherein said second epicyclic gear train comprises a ring gear, wherein said ring gear comprises a radial periphery with lobe-shaped teeth, and wherein said ring gear comprises an inner gerotor gear of said second pump.

42. The transmission of claim 37, wherein said first epicyclic gear train comprises a ring gear operably connecting said first epicyclic gear train with said second epicyclic gear train.

43. A self-propelled lawn and garden implement having at least two ground-engaging wheels, a rotatable blade, an engine and a variable speed, reversible transmission comprising:

a rotatable input member connectable to the engine;

an output member rotatable in forward and reverse directions;

a housing;

a first pump within said housing for pumping a fluid through a first fluid conduit;

a second pump within said housing for pumping a fluid through a second fluid conduit;

a first gear train operatively connected to said input member and said output member for transmitting rotational power of said input member to said output member to rotate said output member in said forward direction, said first gear train comprising an epicyclic gear coupled with said first pump and structured and arranged such that operation of said first pump controls a transmittal of rotational power to said output member through said first gear train, whereby a rotation of said output member in said forward direction is controllable; and a second gear train operatively connected to said input member and said output member for transmitting rotational power of said input member to said output member to rotate said output member in said reverse direction, said second gear train comprising an epicyclic gear coupled with said second pump and structured and arranged such that operation of said second pump controls a transmittal of rotational power to said output member through said second gear train, whereby a rotation of said output member in said reverse direction is controllable.

44. The implement of claim 43 wherein said first and second pumps of the transmission comprise separate gerotor pumps.

45. The implement of claim 44 wherein said epicyclic gear of said second gear train of the transmission comprises a ring gear, wherein said ring gear comprises a radial periphery with lobe-shaped teeth, and wherein said ring gear comprises an inner gerotor gear of said second pump.

46. The implement of claim 43 in which the transmission further comprises first and second adjustable valves, said first adjustable valve disposed along said first fluid conduit for varying a resistance to movement of fluid within said first fluid conduit to adjust an operational speed of said first pump, said second adjustable valve disposed along said second fluid conduit for varying a resistance to movement of fluid within said second fluid conduit to adjust an operational speed of said second pump, whereby speeds of rotation of said output member in said forward and rearward directions are controllable.

47. The implement of claim 46 wherein said first and second adjustable valves of the transmission comprise different recessed portions of a common control rod.

48. The implement of claim 43, wherein said transmission input member is connectable to a drive source via a flexible torque conveying element.

49. The implement of claim 48, wherein said flexible torque conveying element is a belt.

50. The implement of claim 43, wherein said output member comprises a differential gear system.

51. The implement of claim 43, wherein said input member includes a first end and a second end, said first end proximate said first pump.

52. The implement of claim 51, wherein said first end of said input member projects from said housing.

53. The implement of claim 51, wherein said second end of said input member projects from said housing.

54. The transmission of claim 31, wherein said pump assembly module is assembled as a unit prior to its assembly to said housing.

* * * * *